(12) United States Patent
Rusek et al.

(10) Patent No.: US 12,434,297 B2
(45) Date of Patent: Oct. 7, 2025

(54) METHODS OF EXTRUDING A NANOPARTICLE COMPOSITION ONTO A SUBSTRATE

(71) Applicant: XTPL S.A., Wrocław (PL)

(72) Inventors: Marcin Rusek, Wrocław (PL); Lukasz Witczak, Łódź (PL); Filip Granek, Mrozów (PL)

(73) Assignee: XTPL S.A., Wrocław (PL)

( * ) Notice: Subject to any disclaimer, the term of this patent is extended or adjusted under 35 U.S.C. 154(b) by 449 days.

(21) Appl. No.: 18/040,324

(22) PCT Filed: Oct. 7, 2021

(86) PCT No.: PCT/IB2021/059194
§ 371 (c)(1),
(2) Date: Feb. 2, 2023

(87) PCT Pub. No.: WO2022/074595
PCT Pub. Date: Apr. 14, 2022

(65) Prior Publication Data
US 2023/0264262 A1    Aug. 24, 2023

Related U.S. Application Data

(60) Provisional application No. 63/088,549, filed on Oct. 7, 2020.

(51) Int. Cl.
*B22F 10/10* (2021.01)
*B22F 10/31* (2021.01)
(Continued)

(52) U.S. Cl.
CPC .............. *B22F 10/10* (2021.01); *B22F 10/31* (2021.01); *B22F 10/85* (2021.01); *B22F 12/90* (2021.01);
(Continued)

(58) Field of Classification Search
CPC .... G06T 7/50; G06T 7/70; G06T 7/11; G01N 35/00029; G01N 35/1011; G01N 1/31
See application file for complete search history.

(56) References Cited

U.S. PATENT DOCUMENTS

| | | | |
|---|---|---|---|
| 2007/0289483 A1* | 12/2007 | Cho ...................... | C09D 11/322 106/31.13 |
| 2013/0021461 A1* | 1/2013 | Zahniser .............. | G06V 20/695 382/128 |
| 2020/0232785 A1* | 7/2020 | Mosher .................. | G06V 10/70 |

FOREIGN PATENT DOCUMENTS

| | | | | |
|---|---|---|---|---|
| WO | WO-2018182751 A1 * | 10/2018 | ............. | G06V 20/64 |
| WO | 2020157547 A1 | 8/2020 | | |
| WO | 2022074595 A1 | 4/2022 | | |

OTHER PUBLICATIONS

EP 1 839 781 A2 original document and machine translation (Year: 2007).*

(Continued)

*Primary Examiner* — Tima M. Mcguthry-Banks
(74) *Attorney, Agent, or Firm* — K&L Gates LLP

(57) ABSTRACT

A method of extruding a nanoparticle composition onto a substrate is disclosed. A nanoparticle composition dispenser includes a capillary tube. The capillary tube is oriented such that a first longitudinal axis extending through the capillary tube is tilted at an oblique angle relative to a vertical axis. The capillary tube is positioned above the substrate such that the capillary tube and its reflection from the substrate are visible within a field-of-view of a camera. Digital images of the capillary tube and its reflection are captured and processed to detect the first longitudinal axis extending through the capillary tube and a second longitudinal axis extending through the reflection. A point of intersection of the first longitudinal axis and the second longitudinal axis is calculated to estimate a zero-height position. The capillary tube is (Continued)

positioned at a start position in accordance with the zero-height position.

24 Claims, 31 Drawing Sheets

(51) Int. Cl.
  *B22F 10/85* (2021.01)
  *B22F 12/90* (2021.01)
  *B33Y 10/00* (2015.01)
  *B33Y 50/02* (2015.01)
  *G01N 1/31* (2006.01)
  *G01N 35/00* (2006.01)
  *G01N 35/10* (2006.01)
  *G06T 7/11* (2017.01)
  *G06T 7/50* (2017.01)
  *G06T 7/70* (2017.01)
(52) U.S. Cl.
  CPC ............... *B33Y 10/00* (2014.12); *B33Y 50/02* (2014.12); *G01N 1/31* (2013.01); *G01N 35/00029* (2013.01); *G01N 35/1011* (2013.01); *G06T 7/11* (2017.01); *G06T 7/50* (2017.01); *G06T 7/70* (2017.01)

(56) References Cited

OTHER PUBLICATIONS

International Search Report and Written Opinion for corresponding International PCT Application No. PCT/IB2021/059194, dated Dec. 21, 2021.

\* cited by examiner

METHODS OF EXTRUDING A NANOPARTICLE COMPOSITION ONTO A SUBSTRATE

CROSS REFERENCE TO RELATED APPLICATIONS

This application is a U.S. national stage application, filed under 35 U.S.C. § 371, of International Application No. PCT/IB2021/059194, which was filed on Oct. 7, 2021, and which claims priority to U.S. provisional Patent Application No. 63/088,549, which was filed on Oct. 7, 2020. The contents of each are hereby incorporated by reference into this specification.

BACKGROUND

Various features can be formed by extruding a nanoparticle composition through a capillary tube onto a substrate. By using metallic nanoparticle compositions, conductive features can be formed. These conductive features can have line widths in a range of 1 µm to 10 µm. In order to achieve satisfactory control of the line widths and other properties of the nanoparticle features, it would be preferable to precisely control the vertical position of the capillary tube above the substrate in a range of 0 µm to 8 µm. Improved methods of determining the vertical position of the capillary tube are desired.

SUMMARY OF THE INVENTION

In one aspect, a method of extruding a nanoparticle composition onto a substrate is disclosed. The method includes the following steps: (A) positioning a nanoparticle composition dispenser comprising a capillary tube above the substrate; (B) estimating a position of the capillary tube at zero height above the substrate (zero-height position); and (C) extruding the nanoparticle composition from the capillary tube onto the substrate while displacing the capillary tube relative to the substrate from a start position to an end position. The capillary tube is oriented such that its outlet points toward the substrate and a first longitudinal axis extending through the capillary tube is tilted at an oblique angle $\theta$ relative to a vertical axis. Step (B) includes the following sub-steps: (B1) positioning the capillary tube above the substrate such that the capillary tube and its reflection from the substrate are visible within a field-of-view of a camera of an imaging system; (B2) capturing, by the camera, digital images of the capillary tube and its reflection; (B3) processing the digital images to detect the first longitudinal axis extending through the capillary tube and a second longitudinal axis extending through the reflection; (B4) calculating a point of intersection of the first longitudinal axis and the second longitudinal axis to estimate the zero-height position; (B5) obtaining a correlation of digital vertical displacement in the digital images to physical vertical displacement of the capillary tube; and (B6) positioning the capillary tube at the start position in accordance with the zero-height position and the correlation.

In another aspect, a method of extruding a nanoparticle composition onto a substrate is disclosed. The method includes the following steps: (A) positioning a nanoparticle composition dispenser comprising a capillary tube above the substrate; (B) obtaining a position of the capillary tube at zero height above the substrate (zero-height position); and (C) extruding the nanoparticle composition from the capillary tube onto the substrate while displacing the capillary tube relative to the substrate from a start position to an end position. The capillary tube is oriented such that its outlet points toward the substrate and a first longitudinal axis extending through the capillary tube is tilted at an oblique angle $\theta$ relative to a vertical axis. In a first implementation, step (B) includes the following sub-steps: (B1) positioning the capillary tube above the substrate such that the capillary tube and a background region are visible within a field-of-view of a camera of an imaging system; (B2) capturing, by the camera, digital images of the capillary tube and the background region while lowering the capillary tube toward the substrate; (B3) detecting, from the digital images, a significant lateral displacement of the capillary tube along a direction of tilt of the capillary tube to determine the zero-height position; and (B4) positioning the capillary tube at the start position in accordance with the zero-height position. In a second implementation, step (B) includes the following sub-steps: (B1) positioning the capillary tube above the substrate such that the capillary tube and a background region are visible within a field-of-view of a camera of an imaging system; (B2) capturing, by the camera, at least one digital image of the background region (background image), with the capillary tube removed from the field-of-view of the camera; (B3) obtaining images of the capillary tube (capillary tube images) by subtracting the background image from the raw images; (B4) processing the capillary tube images to detect the first longitudinal axis extending through the capillary tube; (B5) determining a virtual line that extends between a fixed point at an outer edge of the capillary tube images and a variable point on the first longitudinal axis, the virtual line and the first longitudinal axis intersecting at a fixed angle $\alpha$; (B6) tracking changes in a characteristic length d of the virtual line as the capillary tube is lowered toward the substrate; (B7) determining the zero-height position from the changes in the characteristic length d; and (B8) positioning the capillary tube at the start position in accordance with the zero-height position.

In yet another aspect, a method of extruding a nanoparticle composition onto a substrate is disclosed. The method includes the following steps: (A) positioning a nanoparticle composition dispenser comprising a capillary tube above the substrate; (B) obtaining a position of the capillary tube at zero height above the substrate (zero-height position); and (C) extruding the nanoparticle composition from the capillary tube onto the substrate while displacing the capillary tube relative to the substrate from a start position to an end position. The capillary tube is oriented such that its outlet points toward the substrate and a first longitudinal axis extending through the capillary tube is at an angle $\theta$ of 5° or less relative to a vertical axis. Step (B) includes the following sub-steps: (B1) positioning the capillary tube above the substrate such that the capillary tube and a background region are visible within a first field-of-view of a first camera of an imaging system and within a second field-of-view of a second camera of the imaging system; (B2) capturing, by the first camera and by the second camera, digital images of the capillary tube and background region while lowering the capillary tube toward the substrate; (B3) detecting, from the digital images, a deformation of the capillary tube to determine the zero-height position; and (B4) positioning the capillary tube at the start position in accordance with the zero-height position. The first camera and the second camera are positioned and oriented relative to each other such that three-dimensional perspective information of the capillary tube is obtained.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

Figure 1:
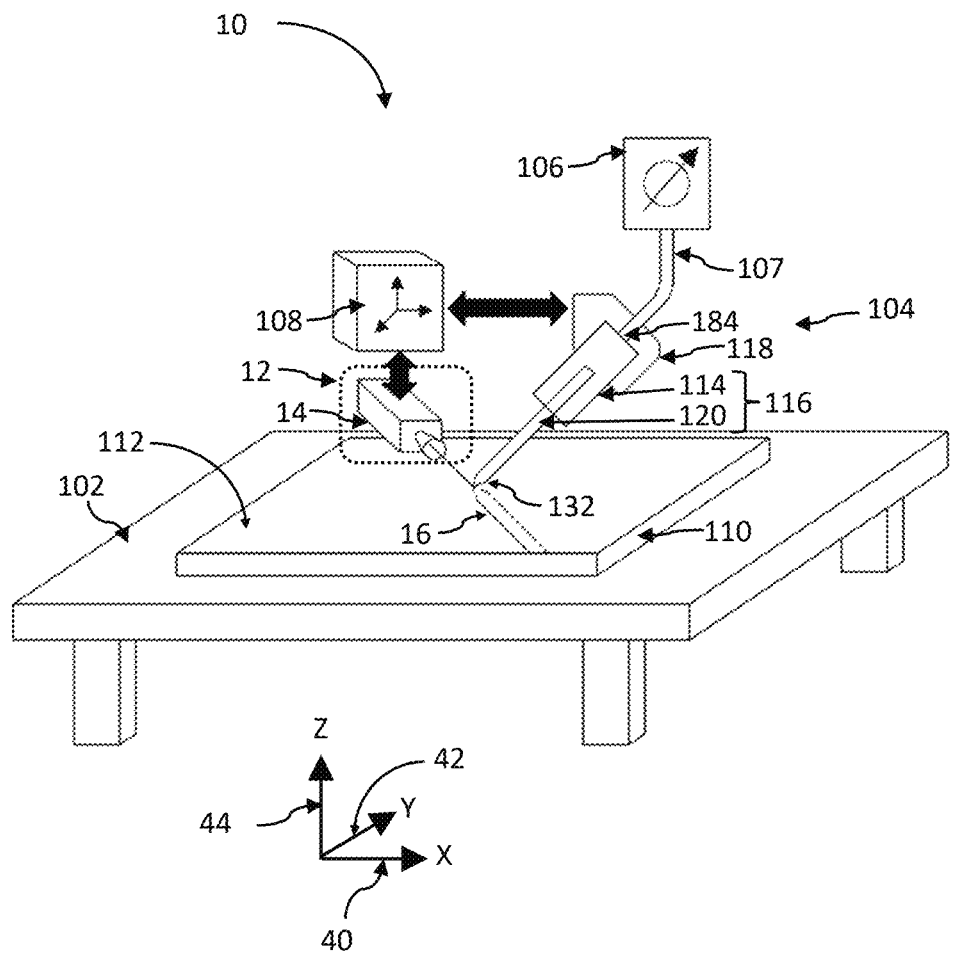
FIGS. 1, 2, and 3 are schematic block diagram views of illustrative nanoparticle composition printing apparatuses.

The present disclosure relates to methods of extruding a nanoparticle composition onto a substrate.

In this Disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

The nanoparticle compositions that are dispensed on a substrate can be metallic nanoparticle compositions or semiconductor nanoparticle compositions for example. Among various metallic nanoparticles, silver nanoparticles and copper nanoparticles are important because of the high electrical conductivity of silver and copper. For example, silver nanoparticles having an average particle size in a range of 20 nm to 80 nm, and copper nanoparticles having an average particle size in a range of 60 nm to 160 nm have been considered.

The preparation of metallic nanoparticle composition includes the synthesis of metallic nanoparticles unless metallic nanoparticles are already available. Generally, the synthesis of metallic nanoparticles in solution employs three components: (1) metal precursors (e.g., $AgNO_3$ for silver nanoparticles and $Cu(NO_3)_2$ for copper nanoparticles); (2) reducing agents (e.g., ethylene glycol for silver nanoparticles and sodium hypophosphite for copper nanoparticles); and (3) stabilizing (capping) agents (e.g., polyvinylpyrrolidone). Polyvinylpyrrolidone, abbreviated as PVP, is soluble in water and other polar solvents. When PVP is effectively used as a dispersant, stable colloidal silver nanoparticles or copper nanoparticles covered (capped) with PVP polymer can be obtained in small size (<250 nm) because the PVP reduces the aggregation of the silver or copper nanoparticles.

The average size of the silver nanoparticles can be controlled to within a range of 20 nm to 80 nm. The average size of the copper nanoparticles can be controlled to within a range of 60 nm to 160 nm. The average particle size and dispersity can be controlled by controlling thermodynamic and kinetic reaction parameters. Reaction temperature, temperature ramp, and reaction time are the important thermodynamic reaction parameters. The rate of adding reagents and molar ratio of used metal precursor to stabilizing agent (PVP) are the important kinetic reaction parameters. An appropriate combination of these parameters leads to obtaining nanoparticles that exhibit the desired properties of small particles size, low dispersity, and high dispersion stability (low occurrence of aggregation).

A metallic nanoparticle composition is made from the metallic nanoparticles. Generally, the nanoparticles are separated, to remove impurities and excess PVP, and dispersed in a solvent mixture including a first solvent and an optional second solvent. The metallic nanoparticle composition may optionally include additives to better control its physicochemical properties. These additives include surfactants, binders, adhesion promoters, and antifoaming agents. We have found that the concentration of such additives should not exceed 3% by weight in the metallic nanoparticle composition.

The preparation of an example composition is described in detail in the Example 1 hereinbelow. The Example 1 composition contains silver nanoparticles and triethylene glycol as a solvent. It has been found that solvents having a boiling point of at least 280° C. at a pressure of 760 mm Hg are preferable. In particular, triethylene glycol, which has a boiling point of 288° C. at a pressure of 760 mm Hg is preferable. On the other hand, it is preferable to reduce or avoid the use of lower-boiling point solvents having a boiling point of less than 280° C. at a pressure of 760 mm Hg. Examples of such lower-boiling point solvents are water, methanol, and ethanol. In a preferred metallic nanoparticle composition, a concentration, in aggregate, of solvents having a boiling point of less than 280° C. at a pressure of 760 mm Hg in the metallic nanoparticle composition does not exceed 3 wt %. In a preferred metallic nanoparticle composition, a concentration of solids (metallic nanoparticles including PVP capping layer) in the metallic nanoparticle composition is 75 wt % or greater, or 80 wt % or greater. In the Example 1 composition, the concentration of silver nanoparticles solids is approximately 85 wt %.

Figure 2:
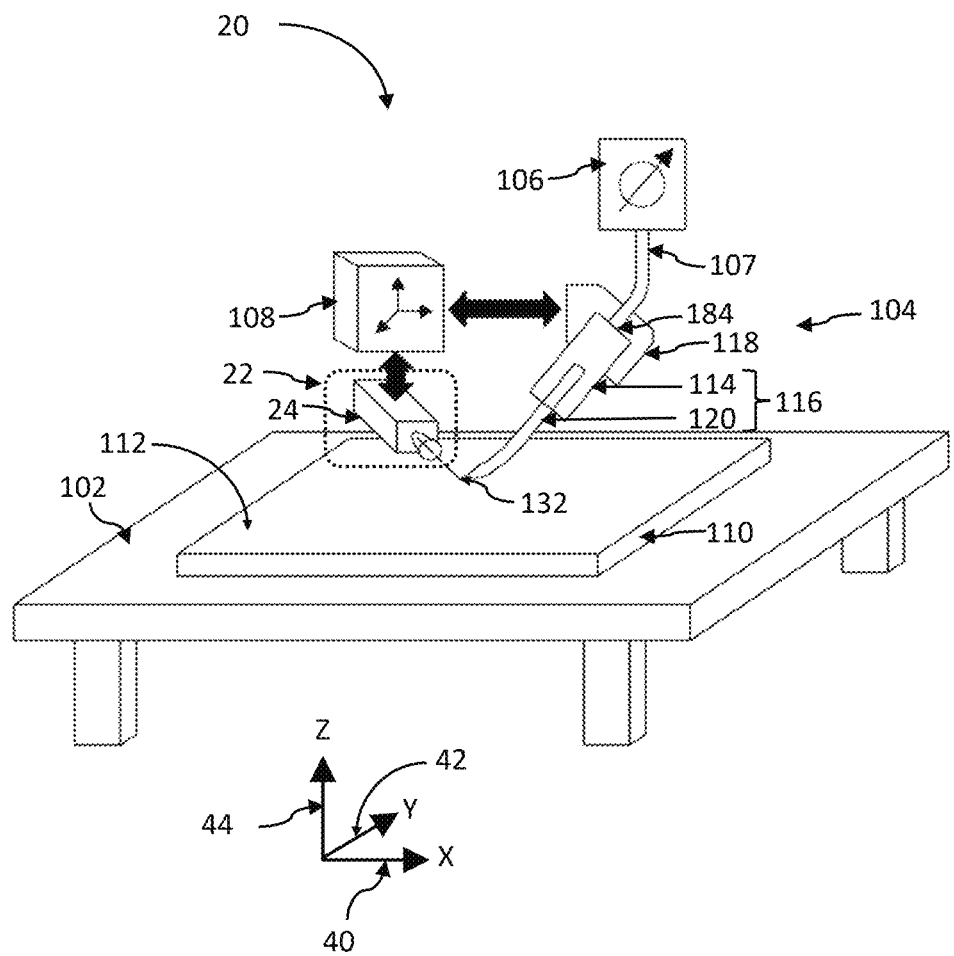
Figure 3:
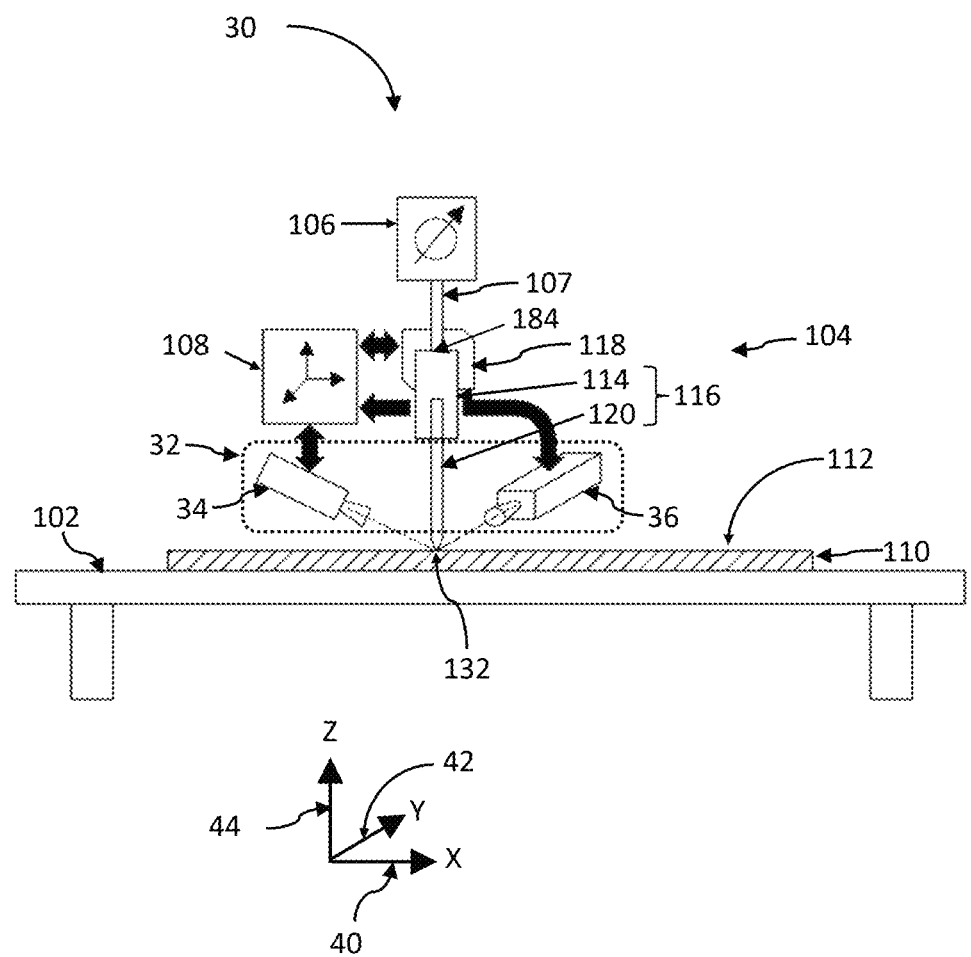

In carrying out methods of dispensing nanoparticle compositions, a printing apparatus is typically used. FIGS. 1, 2, and 3 are schematic block diagram views of illustrative printing apparatuses. In all three implementations, the printing apparatus 10, 20, 30 includes a substrate stage 102, a print head 104, a regulated pneumatic system 106, and a print head positioning system 108. A substrate 110 is fixed in position on the substrate stage 102 during the printing (dispensing) and has a printable surface 112, which is facing upward and facing towards the print head 104. The print head 104 is positioned above the substrate 110. The print head 104 includes a metallic nanoparticle composition dispenser 116 and a cartridge holder (dispenser holder) 118. The metallic nanoparticle composition dispenser 116 includes a piston-cylinder assembly 114 and a capillary tube 120, as described with reference to FIG. 10. Typically, the regulated pneumatic system 106 includes a pump and a pressure regulator. In the examples shown in FIGS. 1, 2, and 3, a pneumatic port 184 of the piston cylinder assembly 114 is coupled to the regulated pneumatic system 106 via tubing 107. Preferably, the regulated pneumatic system 106 is capable of applying pressure in a range of 0 bar to 9 bar to the pneumatic port 184.

The print head positioning system 108 controls the vertical displacement (along z-axis direction 44) of the print head 104 and the lateral displacement (along x-axis direction 40 and/or y-axis direction 42) of the print head 104 relative to the substrate. During dispensing of the metallic nanoparticle composition onto the substrate, the print head 104 is moved laterally and/or vertically.

Figure 9:
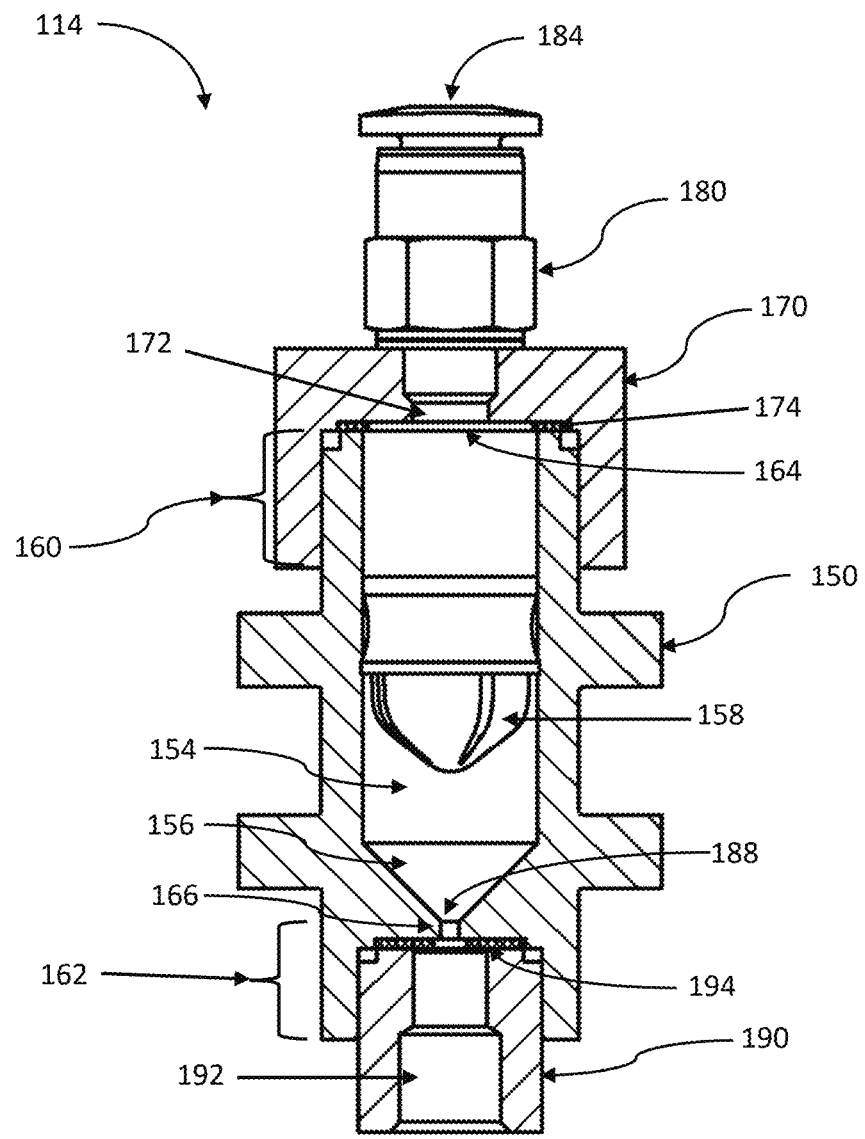
FIG. 9 is a schematic side view and partial cross-sectional view of a piston-cylinder assembly.

The piston-cylinder assembly 114 is sometimes referred to as a printer cartridge. A schematic side view and partial cross-sectional view of an exemplary piston-cylinder assembly 114 is shown in FIG. 9. In the example shown, the piston-cylinder assembly 114 includes a cylinder 150, a cylinder cover 170, a pneumatic connector 180, and an intermediate sealing sleeve 190. The cylinder 150 is shown in cross-section to show a cylindrical cavity portion 154 and a conical cavity portion 156. A piston 158 is located inside cylinder 150. The cylinder 150 has a first end (top end) portion 160 and a second end (bottom end) portion 162 opposite the first end. The cylinder cover 170 is sealably mated to the cylinder 150 at the first end portion 160. In the example shown, an interior surface of the cylinder cover 170 and an exterior surface of the cylinder 150 at its first end portion 160 form a threaded joint. A flat gasket 174 is under compression between the cylinder cover 170 and the cylinder 150 and forms a seal. The intermediate sealing sleeve 190 is sealably mated to the cylinder 150 at the second end portion 162. In the example shown, an exterior surface of the intermediate sealing sleeve 190 and an interior surface of the cylinder 150 at its second end portion 162 form a threaded joint. A flat gasket 194 is under compression between the intermediate sealing sleeve 190 and the cylinder 150 and forms a seal.

The cylinder cover 170 has an opening 172, which retains the pneumatic connector 180. A pneumatic port 184 extends longitudinally through the pneumatic connector 180. The cylinder 150 has a first end 164, in the first end portion 160, and a second end 166, in the second end portion 162. Accordingly, the pneumatic port is at the first end of the cylinder. Air or fluid enters the cylinder from the pneumatic port 184. Inside the cylinder, air or fluid first travels through the cylindrical cavity portion 154 and then a conical cavity portion 156, which tapers to an outlet port 188 at its apex. The outlet port 188 is at the second end 166 opposite the first end 164. The piston 158 is movable in the cylinder 150 between the first end 164 and the second end 166.

Figure 4:
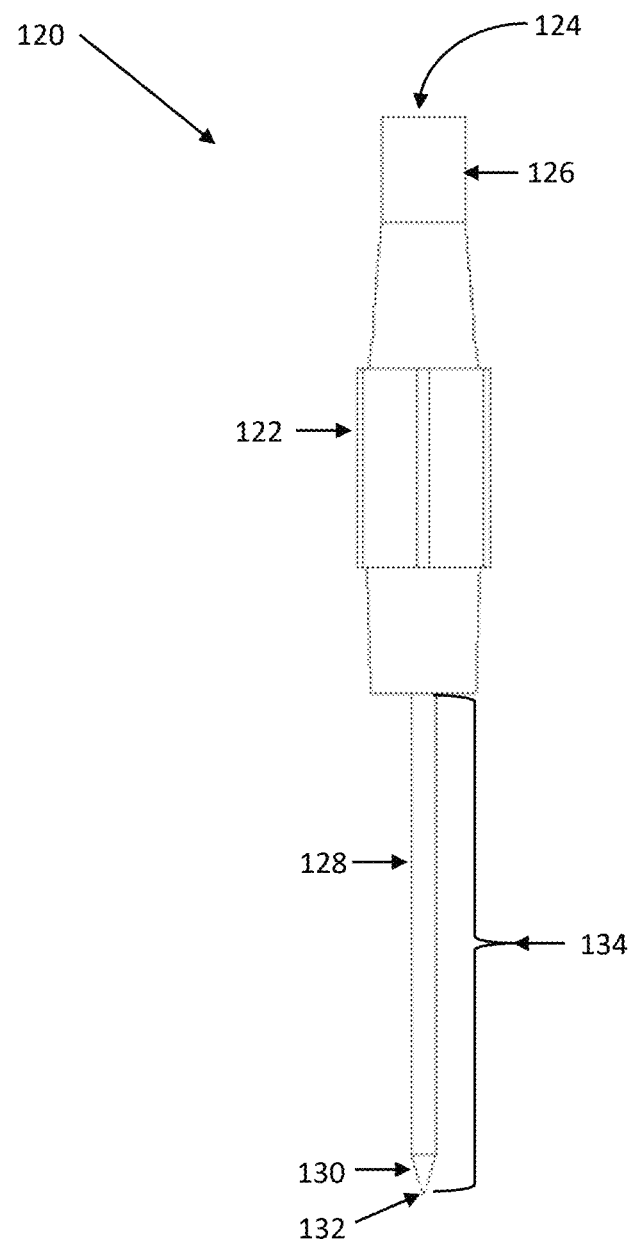
FIG. 4 is a schematic side view of a glass capillary tube.
Figure 10:
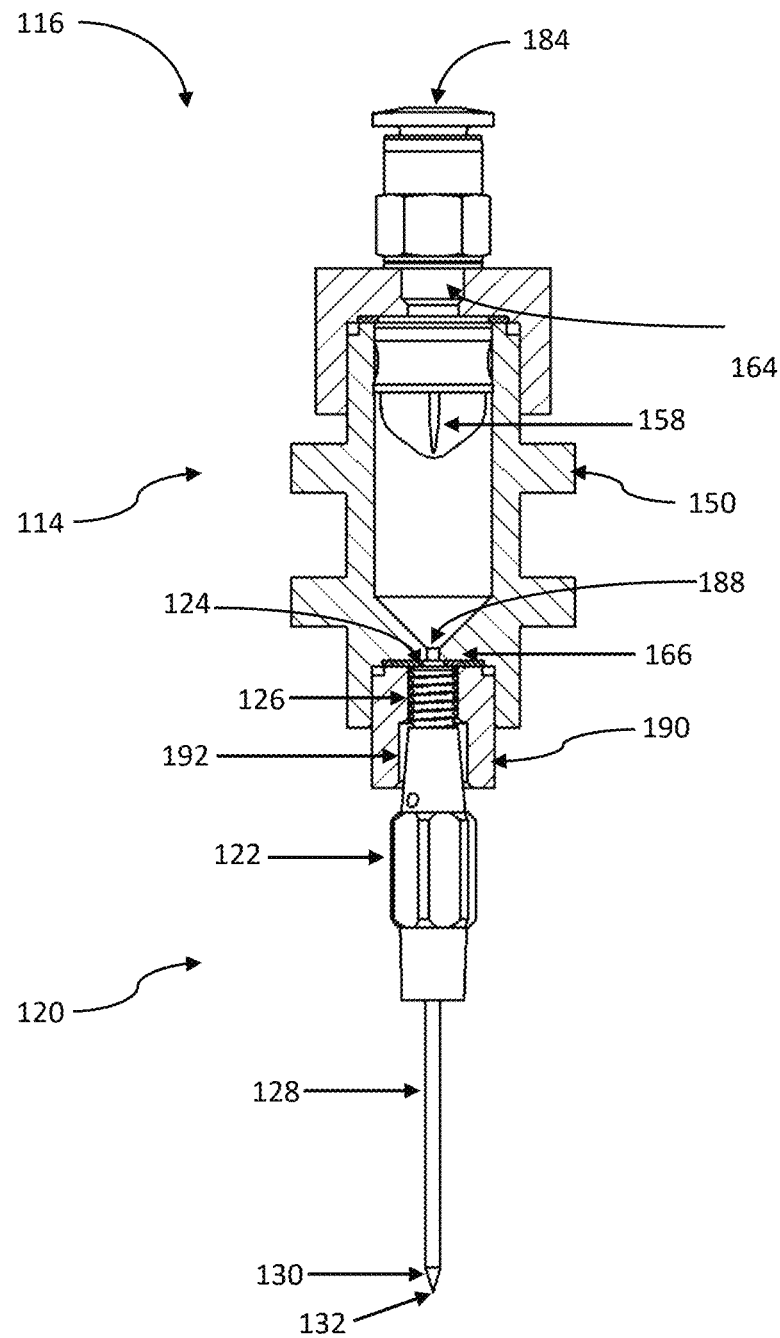
FIG. 10 is a schematic side view and partial cross-sectional view of a metallic nanoparticle composition dispenser.

FIG. 10 is a schematic side view and partial cross-sectional view of a dispenser 116. The dispenser 116 includes a piston-cylinder assembly 114 (FIG. 9) and a capillary tube (nozzle) 120. Capillary tube 120 has a tube inlet 124 and a tube outlet 132. Capillary tube 120 is described in greater detail with reference to FIG. 4. In the example shown, there is a handle 122, including a threaded portion 126, attached to the capillary tube. The threaded portion 126 and an interior surface 192 of the intermediate sealing sleeve 190 form a threaded joint. Accordingly, the intermediate sealing sleeve retains the handle that is attached to the capillary tube. The tube inlet 124 of capillary tube 120 is coupled to the outlet port 188 at the second end 166 of the cylinder 150. A capillary tube 120 is installed in the piston-cylinder assembly 114, to form a dispenser 116. The dispenser is particularly suited to dispense metallic nanoparticle compositions described herein. Accordingly, the dispenser is sometimes referred to as a metallic nanoparticle composition dispenser.

Commercially available glass capillary tubes can be used in the dispenser. For example, glass capillary tubes (Eppendorf™ Femtotips™ II Microinjection Capillary Tips), having an inner diameter at the tip of 0.5 μm and an outer diameter at the tip of 0.7 μm, are available from Fisher Scientific. A commercially available glass capillary tube 120 is shown schematically in FIG. 5. The glass capillary tube has an inlet 124 at a first end, and outlet 132 at a second end opposite the first end, and an elongate fluid passageway between the inlet 124 and outlet 132. A plastic handle 122 is attached to the glass capillary tube 120 around its circumference. The plastic handle 122 includes an inlet (input end) 124 and a threaded portion 126 near the inlet 124 which enables a threaded connection to an external body or external conduit (see FIG. 10). The inlet 124 has an inner diameter of 1.2 mm.

Figures 5, 6:
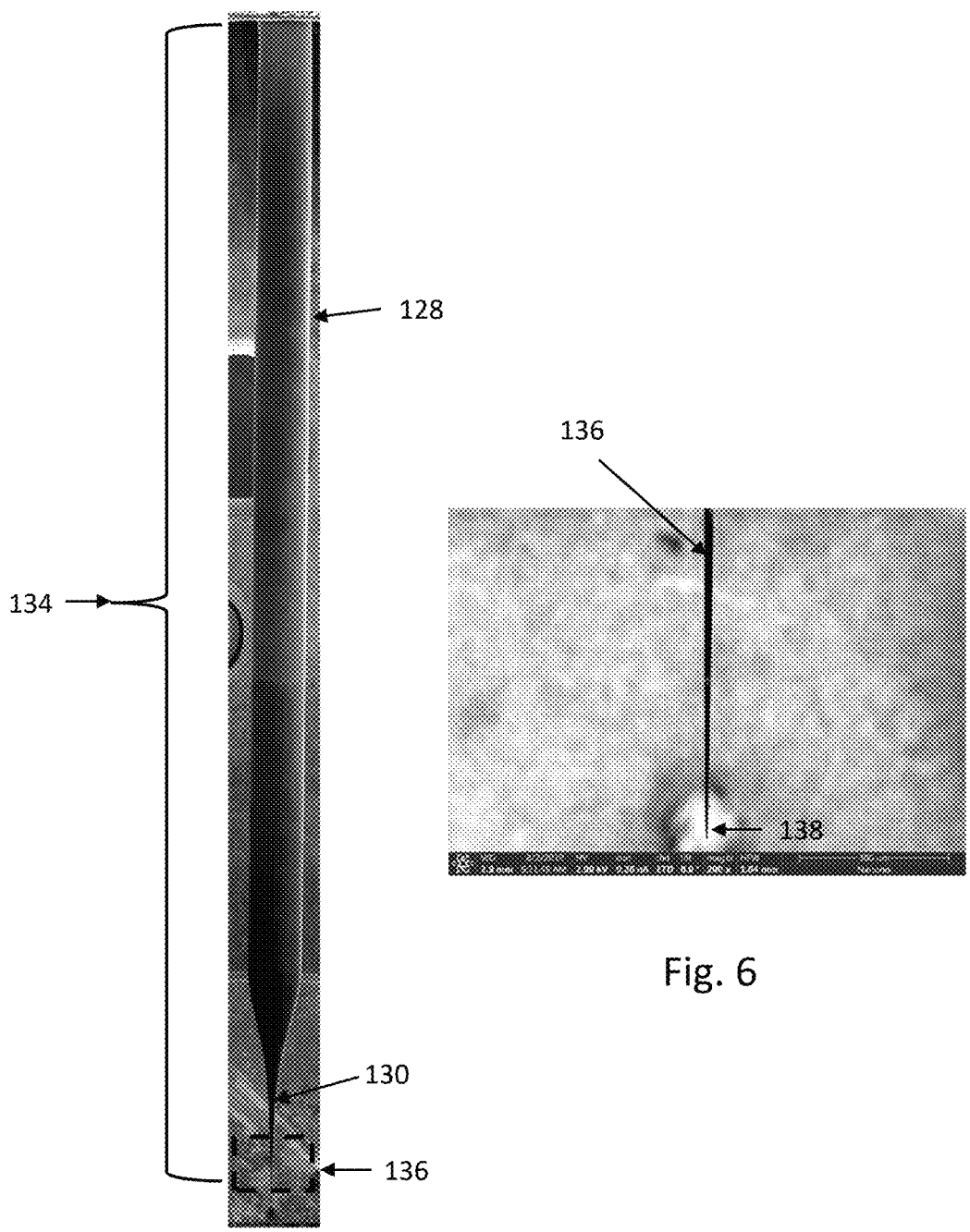
FIG. 5 is a scanning electron microscope (SEM) view of a portion of a glass capillary tube.
FIG. 6 is a scanning electron microscope (SEM) view of a tapering portion of the glass capillary tube, under low magnification.
Figure 7:
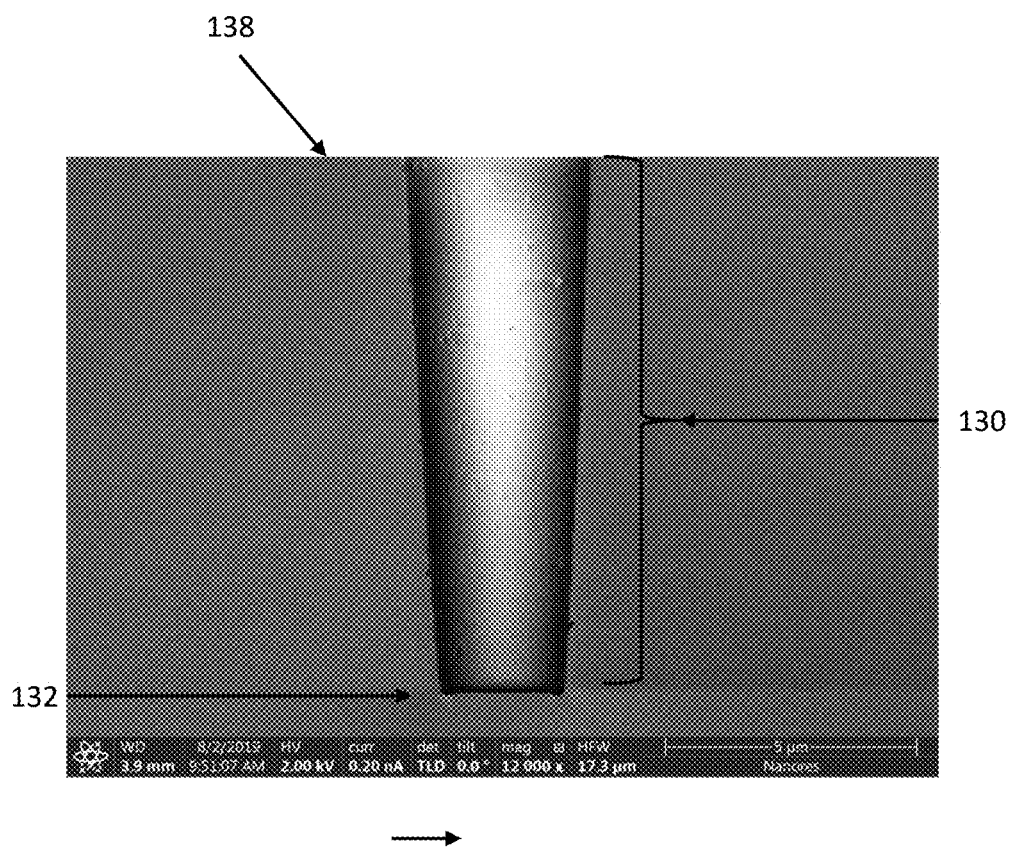
FIG. 7 is a scanning electron microscope (SEM) view of a tapering portion of the glass capillary tube, under high magnification.

The glass capillary tube includes an elongate input portion 128 and a tapering portion 130. There is an externally visible portion 134 of the glass capillary tube 120. Some of the elongate input portion 128 may be obscured by the surrounding plastic handle 122. The tapering portion 130 tapers to an outlet (output end) 132 (having an inner diameter of 0.5 μm and an outer diameter at the tip of 0.7 μm in the case of the certain Femtotips™ II Microinjection Capillary Tips). Stainless-steel capillary tubes can also be used. The reduction of diameter along the tapering portion 130 from the elongate input portion 128 to the outlet 132 is more clearly illustrated in FIGS. 5 through 7. FIG. 5 is a scanning electron micrograph view (formed from stitching together multiple SEM images) of the entire externally visible portion 134 of the glass capillary tube 120. A first magnification region 136 of the tapering portion 130 including the outlet 132, observed under low magnification in a scanning electron microscope (SEM), is shown in FIG. 6. Furthermore, a second magnification region 138 located within the first magnification region 136, observed under high magnification in a scanning electron microscope (SEM), is shown in FIG. 7. The outer diameter is smallest at the outlet 132 (FIG. 7) and increases with increasing longitudinal distance from the outlet 132.

Figure 8:
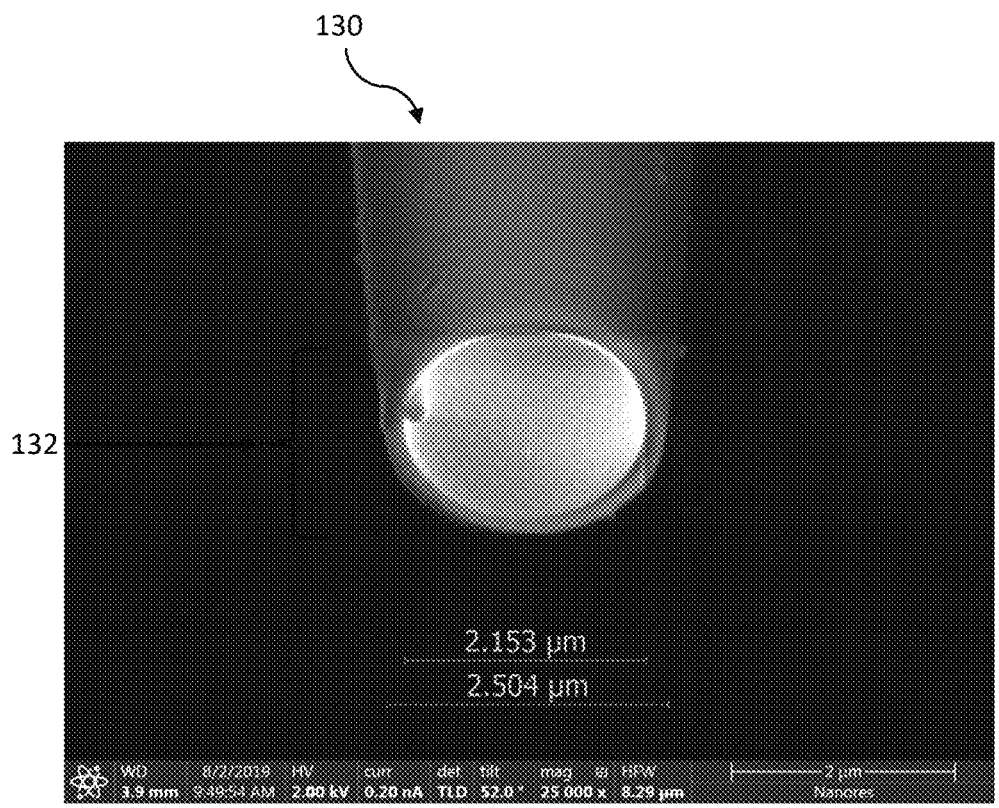
FIG. 8 is a scanning electron microscope (SEM) view of the output portion after focused-ion beam treatment, under high magnification.

In many cases it is desirable to increase the size of the outlet (outlet size). It is possible to increase the outlet size by cutting the glass capillary tube 120 at a suitable longitudinal location along the tapering portion 130. Cutting may be done using a focused-ion beam (FIB) apparatus. For example, a plasma-source $Xe^+$ FIB (also called PFIB) is used. The capillary tube is installed in the FIB apparatus. A longitudinal location along the tapering portion 130 is selected, and the focused ion beam is directed to it, with sufficient energy density for cutting the glass tube. A cut is made using the focused-ion beam across the tapering portion at the selected longitudinal location. A scanning electron microscope (in the FIB apparatus) is used to measure the outer diameter or inner diameter or both at the tip. If the measured inner diameter or outer diameter or both are too small, the cutting is carried out at another longitudinal location along the tapering portion. In the example shown in FIG. 8, the outlet inner diameter is measured to be 2.153 μm and the outlet outer diameter is measured to be 2.504 μm. We refer to the outlet outer diameter as the outlet size. For glass capillary tubes 120, outlet sizes in a range of 0.7 μm to 8 μm are possible and have been tried.

In preparing a printing apparatus for use, a metallic nanoparticle composition is injected into the cylinder 150. In the case of the piston-cylinder assembly shown in FIG. 9, this can be accomplished by injecting the metallic nanoparticle composition into the cylinder 150 via its first end 164 using a syringe, with the piston 158 removed from the cylinder and the cover 170 and the pneumatic connector 180 detached from the cylinder 150. Subsequently, the piston is positioned in the cylinder. Additionally, in the example shown in FIG. 9, the cylinder cover 170 and the pneumatic connector 180 are attached to the cylinder 150. The pneumatic port 184 is coupled to a regulated pneumatic system 106 via tubing 107.

Figure 11:
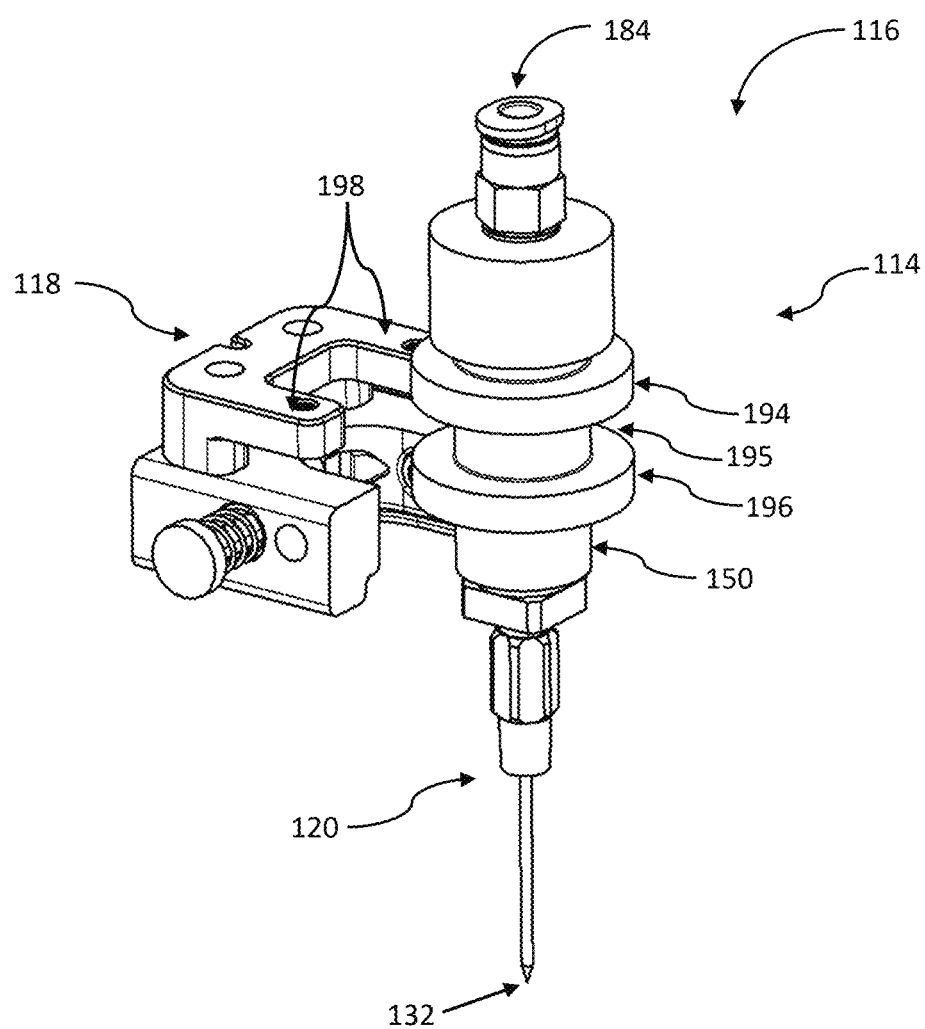
FIG. 11 is a schematic perspective view of a metallic nanoparticle composition dispenser and an associated dispenser holder.

FIG. 11 is a schematic perspective view of a metallic nanoparticle composition dispenser 116 and an associated dispenser holder 118. The dispenser holder 118 includes a fork 198. When assembled, the fork is inserted into a groove 195 between two annular protrusions 194, 196 that protrude radially outward from the outer walls of the cylinder 150. Accordingly, the dispenser holder 118 retains the dispenser. The dispenser holder 118 is mechanically coupled to the print head positioning system 108. In preparing a printing apparatus for use, the dispenser 116 is installed in the dispenser holder 118.

Figure 12:
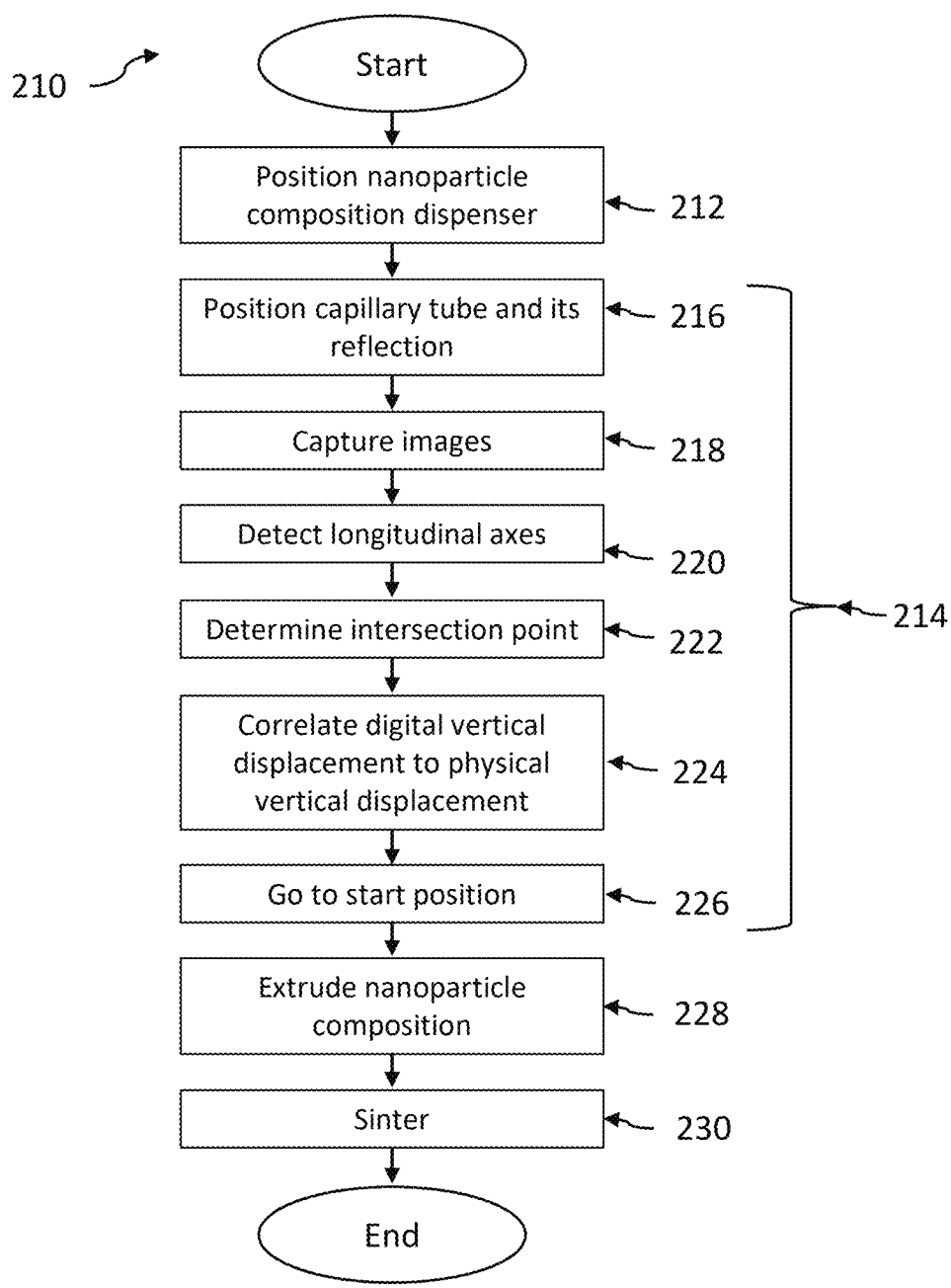
FIGS. 12, 13, and 14 are flow diagram of first, second, and third methods of extruding a nanoparticle composition onto a substrate, respectively (Method 1, 2, 3).
Figure 15:
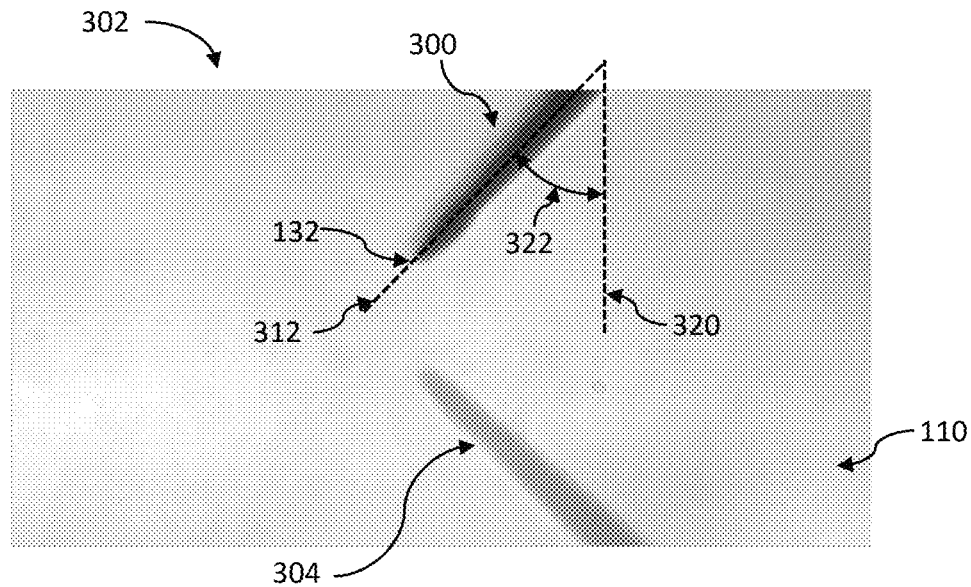
FIGS. 15, 16, 17, and 18 are digital images captured and processed by the imaging system during Method 1 (FIG. 12).

The nanoparticle composition printing apparatus 10 (FIG. 1) is used to carry out a method of extruding a nanoparticle composition onto a substrate (method 210 of FIG. 12). The printing apparatus 10 includes an imaging system 12, including a camera 14. In addition to the camera 14, the imaging system 12 may include image processing software resident on a computer, with the computer being coupled to the camera 14. The imaging system 12 is coupled to the positioning system 108. The positioning system 108 controls the positioning of the nanoparticle composition dispenser 116 and the camera 14. The camera 14 and the capillary tube 120 are positioned and oriented relative to each other such that the capillary tube 120 and its reflection 16 (from the substrate) are visible within a field-of-view of the camera 14. For example, FIG. 15 is a digital image captured by the camera 14, showing its field-of-view 302. It is not necessary that the entire capillary tube 120 be visible in the field-of view. FIG. 15 shows a portion 300 of the glass capillary tube 120 near its outlet (tip) 132 and a portion 304 of the capillary tube's reflection 16. Only the capillary tube portion 300 and the reflection portion 304 need to be visible in the field-of-view 302.

Method 210 includes steps 212, 214, 228, and 230. At step 212, the nanoparticle composition dispenser 116, which includes the capillary tube 120, is positioned above the substrate 110, and the capillary tube is oriented such that its outlet points toward the substrate. FIG. 15 shows a portion 300 of the glass capillary tube 120 near its outlet (tip) 132. The capillary tube is oriented such that its outlet 132 points toward the substrate. A first longitudinal axis 312 extending through the capillary tube 120 (portion 300 is shown) is tilted at an oblique angle θ (322) relative to a vertical axis 320. Preferably, this oblique angle θ is in a range of 5° to 50°, and more preferably the oblique angle θ is in a range of 20° to 50°.

Figure 16:
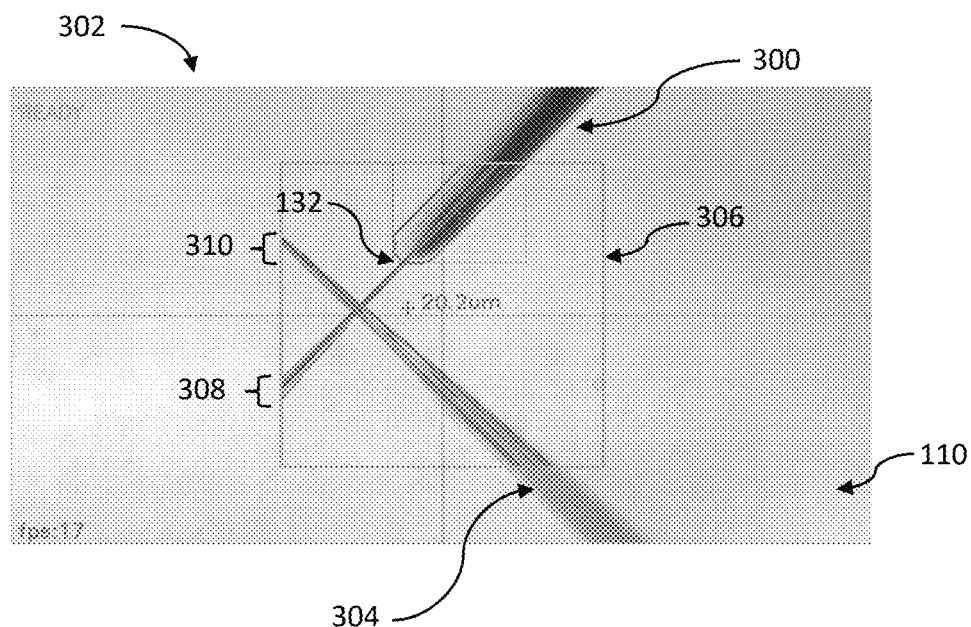
Figure 17:
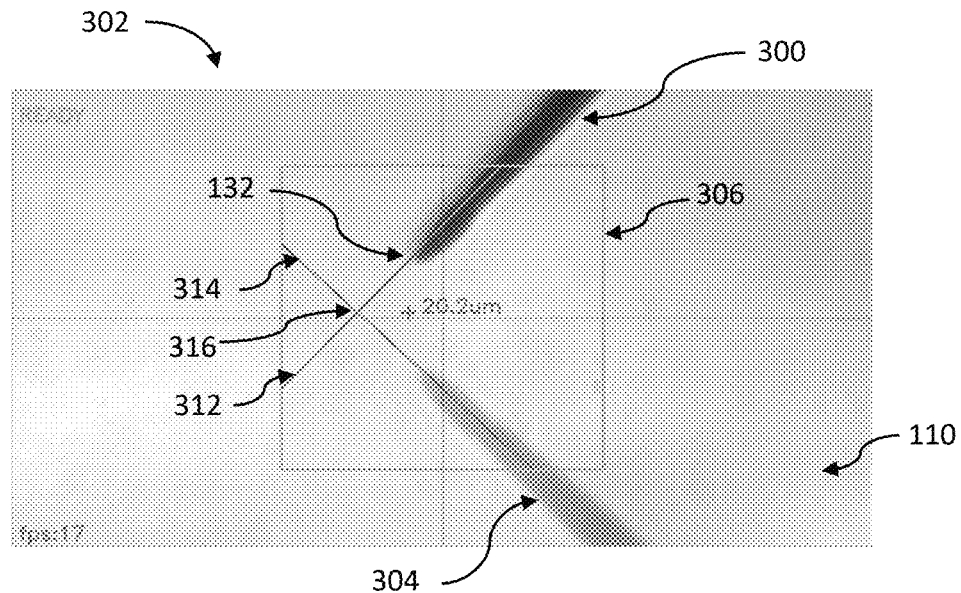

At step 214, a position of the capillary tube (in this example, position of the outlet 132 of the capillary tube) at zero height above the substrate (zero-height position) is estimated. In carrying out step 214, it is not necessary that the capillary tube contact the substrate. Step 214 includes sub-steps 216, 218, 220, 222, 224, and 226. At sub-step 216, the capillary tube is positioned above the substrate 110 such that the capillary tube portion 300 and its reflection 304 (reflection from the substrate 110) are visible within a field-of-view 302 of the camera 14. At sub-step 218, digital images of the capillary tube portion 300 and the reflection portion 304 are captured by the camera 14 (FIG. 15). At sub-step 220, the digital images are processed to detect the first longitudinal axis extending through the capillary tube and a second longitudinal axis extending through the reflection. FIG. 16 shows the image of FIG. 15 after image processing by the imaging system 12. A bounding box 306 has been applied to a region-of-interest within the field-of-view 302. In the example shown in FIG. 16, the imaging system 12 has identified several longitudinal lines 308 extending through the capillary tube (capillary tube portion 300) and several longitudinal lines 310 extending through the reflection (reflection portion 304). In the example shown in FIG. 17, the imaging system 12 has detected a first longitudinal axis 312 extending through the capillary tube (capillary tube portion 300) and a second longitudinal axis 314 extending through the reflection 304. For example, this detection can be accomplished by using a suitable model to select one of the longitudinal lines 308 as the first longitudinal axis 312 and to select one of the longitudinal lines 310 as the second longitudinal axis 314. At sub-step 222, a point of intersection 316 of the first longitudinal axis 312 and the second longitudinal axis 314 is calculated to estimate the zero-height position (FIG. 17). The point of intersection 316 is estimated to be the zero-height position. This calculation can be done by the imaging system 12.

Figure 18:
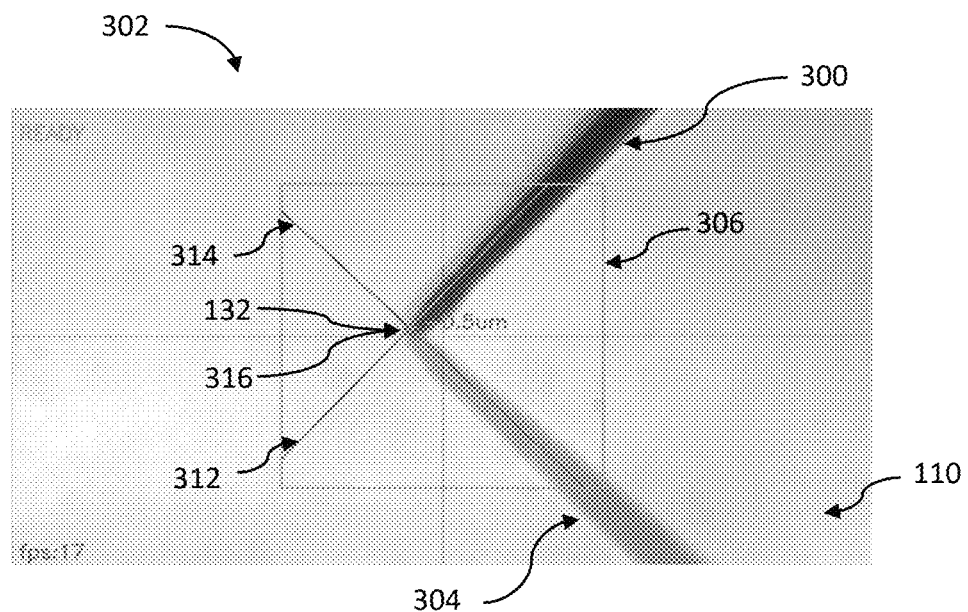

At sub-step 224, a correlation of digital vertical displacement in the digital images to physical vertical displacement of the capillary tube is obtained. This correlation is needed to calculate the vertical position of the capillary tube (i.e., the vertical position of the outlet 132 relative to the zero-height position, in physical units). For example, this correlation can be obtained by (1) displacing the capillary tube 120 to two different heights above the substrate (along z-axis direction 44), in which the height difference in physical units is accurately known by the positioning system 108; (2) concurrently capturing digital images of the capillary tube at the two different heights and processing the images to obtain the height difference in digital units (pixel units); and (3) from the height difference in physical units and the height difference in digital units, calculating scaling and offset coefficients for converting between physical vertical displacement and digital vertical displacement. In the example shown in FIG. 17, the correlation has been obtained and the capillary tube's outlet 132 is estimated to be at a height of 20.2 µm above the zero-height position. At sub-step 226, the capillary tube is positioned at a start position in accordance with the zero-height position and the correlation. FIG. 18 shows the capillary tube at a start position in which the height of the outlet 132 is 0 µm relative to the zero-height position 316. Preferably, the start position is at a height of 8 µm or less relative to the zero-height position.

At step 228, the nanoparticle composition is extruded from the capillary tube onto the substrate while the capillary tube is displaced relative to the substrate from the start position to an end position. The displacement from the start position to the end position includes lateral displacement (along x-axis direction 40 and/or y-axis direction 42). In order to extrude the nanoparticle composition, a pressure is applied to the nanoparticle composition in the dispenser. No electric fields need to be applied to the nanoparticle composition to carry out this extrusion. The applied pressure is preferably in a range of 0 bar (0 millibar) to 9 bar (9000 millibar). At step 230, the workpiece is sintered. The workpiece includes the substrate, the conductive feature, and any other existing features on the substrate. The workpiece can be sintered in an atmosphere of air or in a protective atmosphere. Examples of protective atmospheres are: Argon, Nitrogen, and a mixture of Hydrogen (5 vol. %) and Nitrogen (95 vol. %). The workpiece can be sintered at a temperature of 140° C. or lower. Photonic sintering can also be used. Photonic sintering can be carried out using a laser or a flash lamp. If a laser is used, emission wavelengths of 1064 nm, 532 nm, and 450 nm have been effective. The laser can be operated in continuous-wave mode or pulsed mode.

Figure 43:
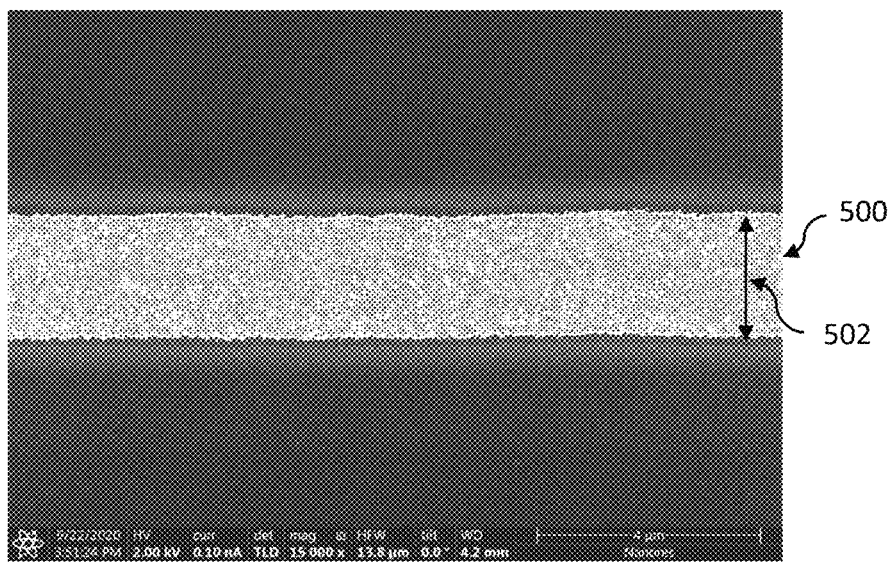
FIGS. 43, 44, and 45 are scanning electron microscope (SEM) images of silver nanoparticle features deposited according to Methods 1, 2, and 3, respectively (FIGS. 12, 13, 14).

FIG. 43 is an SEM micrograph of a line 500 dispensed from a silver nanoparticle composition (Example 1). Line 500 is characterized by a line width 502. The line width 502 is estimated to be approximately 2.2 µm. The capillary tube had an outlet outer diameter of 1.5 µm. The capillary tube was at an initial height of 15 µm above the substrate when sub-step 216 was carried out. The start position (sub-step 226) was at a height of 0 µm relative to the zero-height position. During extrusion, the direction of lateral displacement relative to the tilt of the capillary tube was such that the dispenser 116 traveled ahead of the capillary tube outlet 132. During extrusion of the nanoparticle composition (step 228), the pressure applied to the nanoparticle composition in the dispenser was 4300 millibar and the speed of lateral displacement of the capillary tube was 0.01 mm/sec. During extrusion, the height of the capillary tube was maintained approximately constant.

Figure 13:
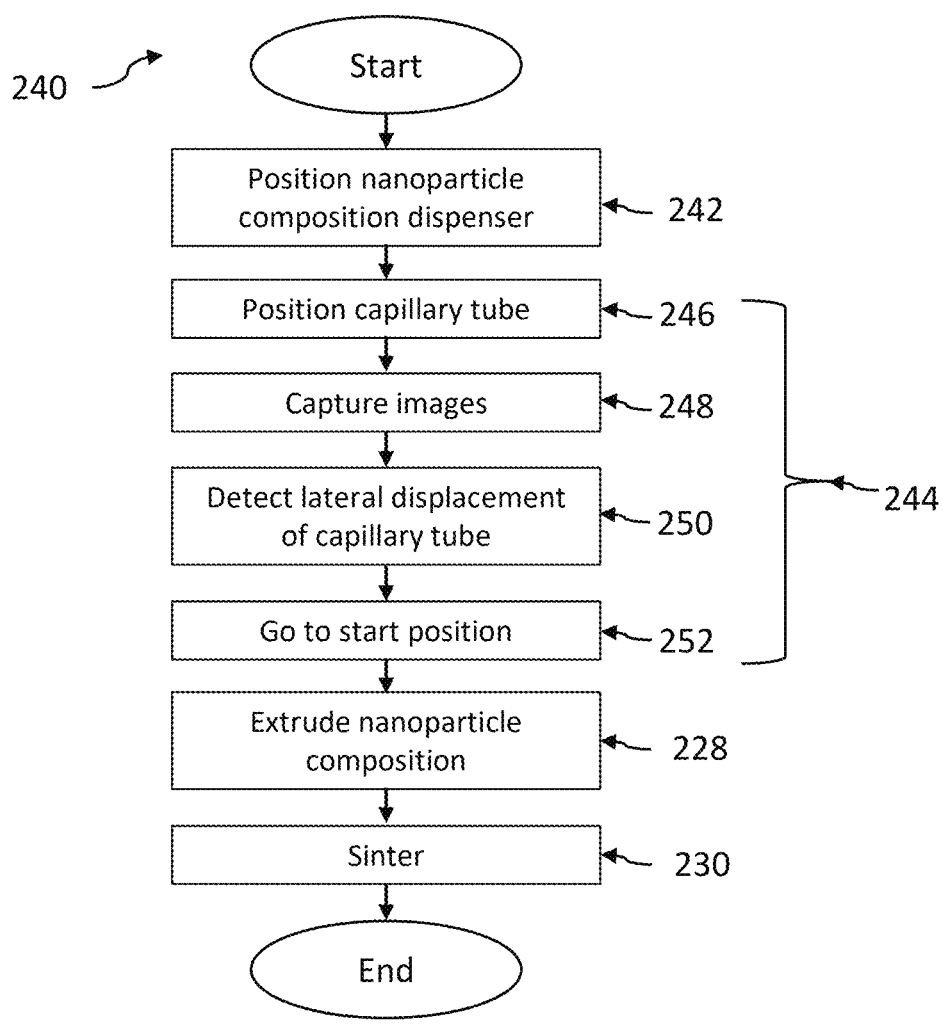
Figure 19:
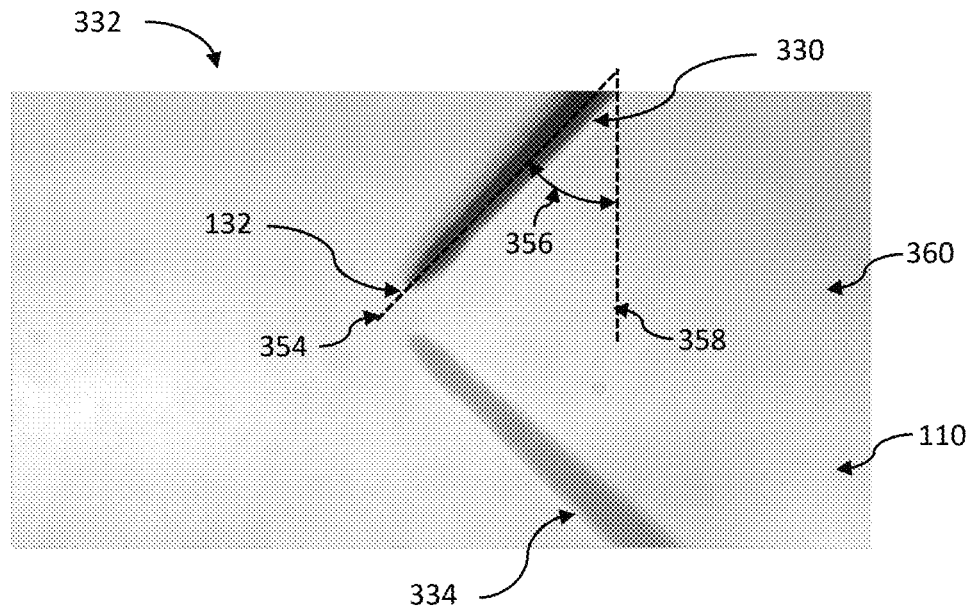
FIGS. 19, 20, 21, 22, 23, and 24 are digital images captured and processed by the imaging system during Method 2 (FIG. 13).

The nanoparticle composition printing apparatus 20 (FIG. 2) is used to carry out a method of extruding a nanoparticle composition onto a substrate (method 240 of FIG. 13). The printing apparatus 20 includes an imaging system 22, including a camera 24. In addition to the camera 24, the imaging system 22 may include image processing software resident on a computer, with the computer being coupled to the camera 24. The imaging system 22 is coupled to the positioning system 108. The positioning system 108 controls the positioning of the nanoparticle composition dispenser 116 and the camera 24. The camera 24 and the capillary tube 120 are positioned and oriented relative to each other such that the capillary tube 120 and a background region are visible within a field-of-view of the camera 14. For example, FIG. 19 is a digital image captured by the camera 24, showing its field-of-view 332. It is not necessary that the entire capillary tube 120 be visible in the field-of view. FIG. 19 shows a portion 330 of the glass capillary tube 120 near its outlet (tip) 132 and a portion 334 of the capillary tube's reflection. Only the capillary tube portion 330 and the surrounding background region need to be visible in the field-of-view 332.

Method 240 includes steps 242, 244, 228, and 230. At step 242, the nanoparticle composition dispenser 116, which includes the capillary tube 120, is positioned above the substrate 110, and the capillary tube is oriented such that its outlet points toward the substrate. FIG. 19 shows a portion 330 of the glass capillary tube 120 near its outlet (tip) 132. The capillary tube is oriented such that its outlet 132 points toward the substrate. A first longitudinal axis 354 extending through the capillary tube 120 (portion 330 is shown) is tilted at an oblique angle θ (356) relative to a vertical axis 358. Preferably, this oblique angle θ is in a range of 5° to 50°, and more preferably the oblique angle θ is in a range of 20° to 50°.

Figure 20:
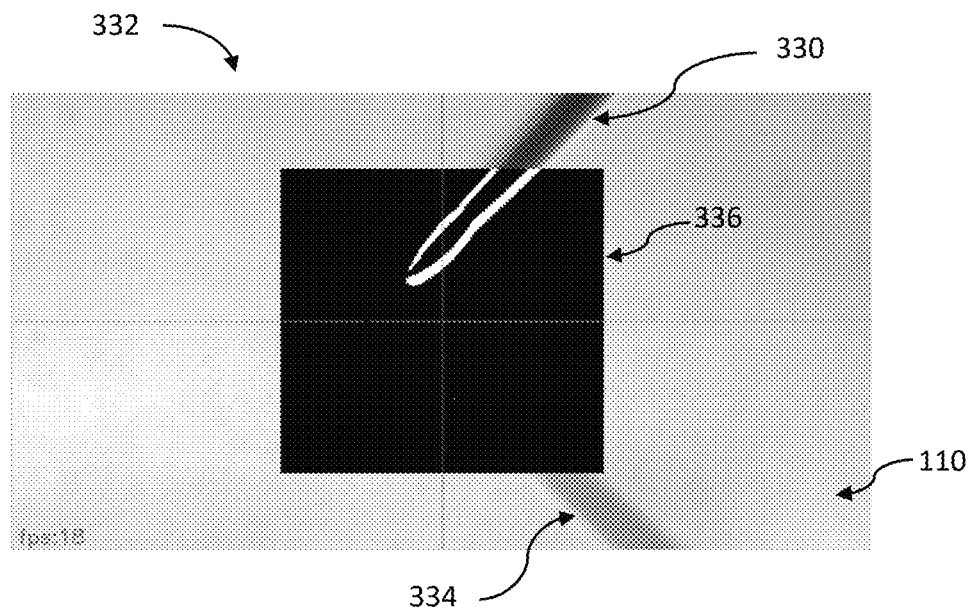

At step 244, a position of the capillary tube (in this example, position of the outlet 132 of the capillary tube) at zero height above the substrate (zero-height position) is obtained. Step 244 includes sub-steps 246, 248, 250, and 252. At sub-step 246, the capillary tube is positioned above the substrate 110 such that the capillary tube portion 330 and its surroundings 360 are visible within a field-of-view 332 of the camera 24. At sub-step 248, digital images of the capillary tube portion 330 and the background region 360 are captured by the camera 24 while lowering the capillary tube toward the substrate. For example, FIGS. 19, 20, 21, and 22 are digital images captured as the capillary tube is lowered toward the substrate. FIG. 20 shows the image of FIG. 19 after image processing by the imaging system 22. A bounding box 336 has been applied to a region-of-interest within the field-of-view 332. Within the bounding box 336, a background subtraction algorithm has been applied to the pixels. Black pixels correspond to the background and white pixels correspond to areas where motion is detected. In FIG. 20, white regions 338A and 338B correspond to a leading edge and a trailing edge of the capillary tube portion 330 as the capillary tube is lowered to the substrate. Movement of capillary tube outlet 132 is also detected (white pixels).

Figure 21:
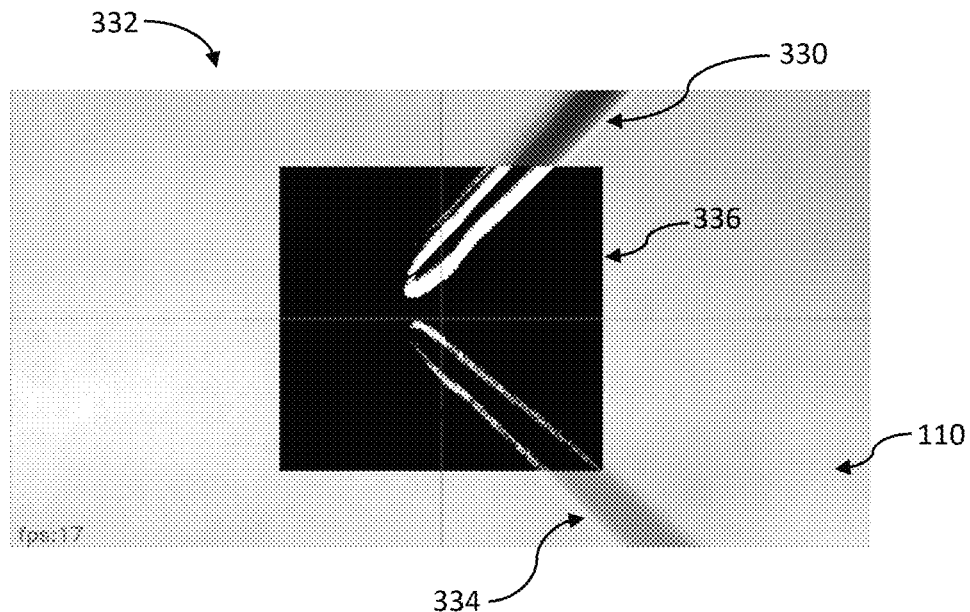

Sub-step 250 includes detecting, from the digital images, a significant lateral displacement of the capillary tube along a direction of tilt of the capillary tube to determine the zero-height position. The significant lateral displacement of the capillary tube occurs because the capillary tube cannot be lowered further. FIG. 21 shows the capillary tube portion 330 after the capillary tube has been lowered toward the substrate from the height shown in FIGS. 19 and 20. As in FIG. 20, capillary tube leading edge and trailing edge regions 338A, 338B and the capillary tube outlet 132 are visible. In addition, a leading edge and trailing edge 340A, 340B of the reflection 334 have now become visible as white pixels because the movement of the reflection 334 has exceeded a detection threshold. A reflection 350 of the capillary tube outlet 132 is visible as white pixels.

Figure 22:
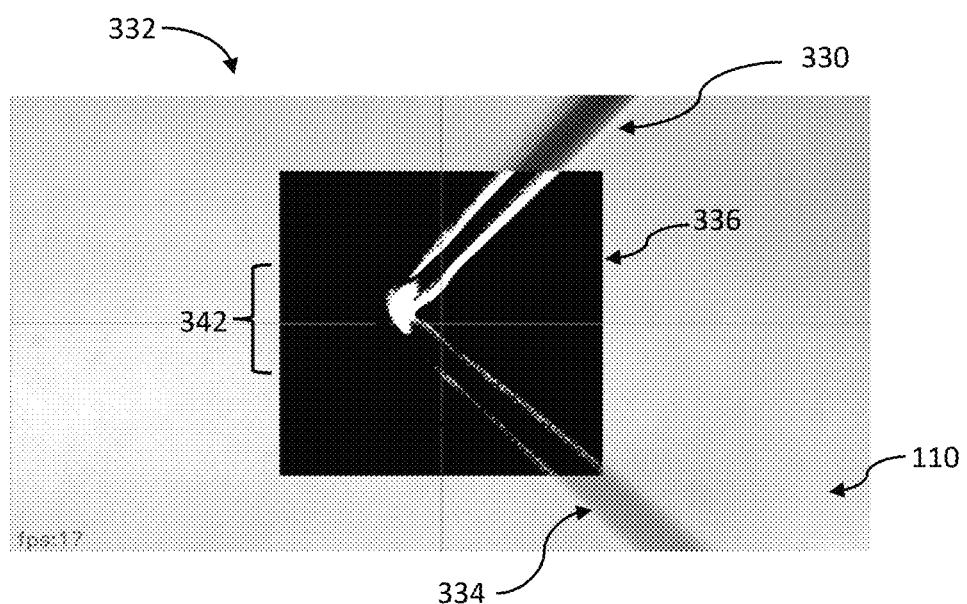
Figure 23:
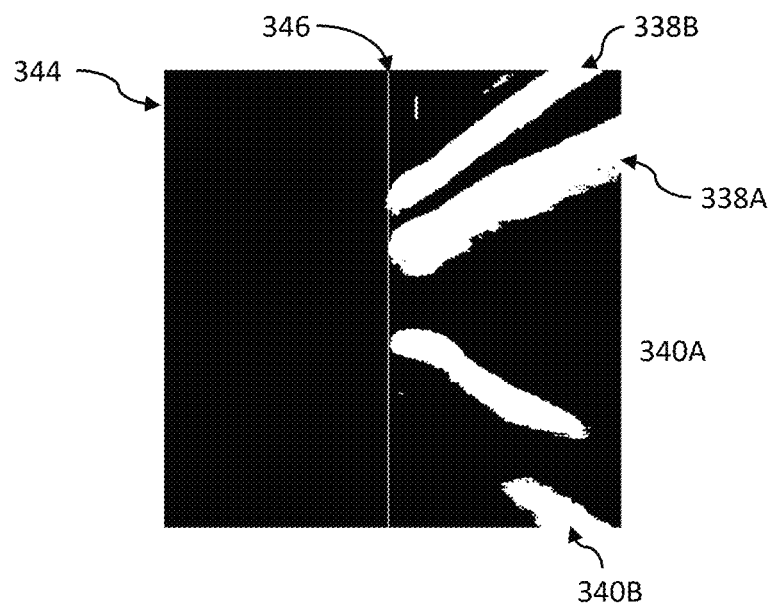

FIG. 22 shows the capillary tube portion 330 after the capillary tube has been lowered toward the substrate from the height shown in FIG. 21. In the example shown in FIG. 22, a significant lateral displacement of the capillary tube has been detected in a region 342 (a region of white pixels) corresponding to capillary tube outlet 132 and its reflection 350. The lateral displacement phenomenon is illustrated in greater detail in FIGS. 23 and 24. FIG. 23 shows a capillary tube being lowered toward the substrate, within a bounding box 344. The moving edges 338A, 338B of a capillary tube and the moving edges 340A, 340B of a reflection of the capillary tube are visible in FIG. 23. The capillary tube outlet 132 has not yet reached the zero-height position. The imaging system 22 has detected a vertical line 346 intersecting the capillary tube outlet 132 and its reflection 350.

Figure 24:
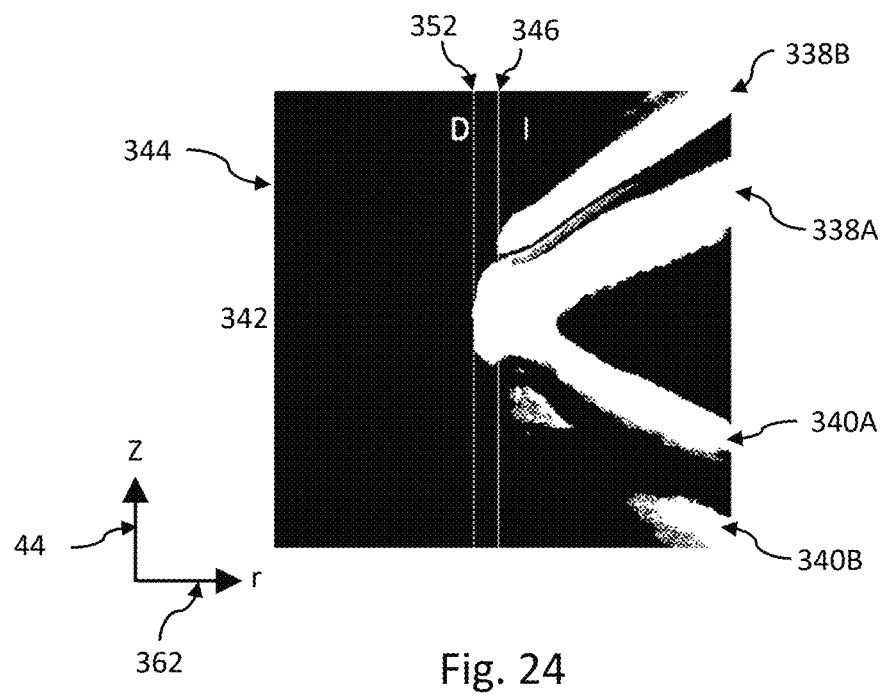

FIG. 24 shows the capillary tube after it has been lowered toward the substrate from the height shown in FIG. 23. The white pixels corresponding to the capillary tube outlet 132 and its reflection 350 have merged into a white region 342. The merging of the capillary tube outlet 132 and the reflection's tip portion indicates that the capillary tube has reached the zero-height position. However, the imaging system 22 does not rely upon the presence of a detectable reflection to determine the zero-height position according to method 240. While the capillary tube is being lowered to the substrate (sub-step 248), the direction of displacement of the capillary tube is primarily along the z-axis direction 44. When the capillary tube contacts the substrate, there is significant lateral displacement of the along a direction of tilt of the capillary tube, e.g., along r-axis direction 362 (within a plane defined by the x-axis direction 40 and the y-axis direction 42). The significant lateral displacement is detectable by the imaging system 22. In FIG. 24, the imaging system 22 has detected a new vertical line 352 intersecting the capillary tube outlet 132 and its reflection 350. Newly detected vertical line 352 is laterally displaced from the previously detected vertical line 346 (of a previous frame, FIG. 23). The number of white pixels enclosed between the newly detected vertical line 352 and previously detected vertical line 346 ("edge white pixels") indicates the extent of the lateral displacement. The height of the capillary tube (as known to the positioning system 108) when the number of edge white pixels exceeds a predetermined threshold is determined to be the zero-height position. In the example shown, the predetermined threshold for the number of edge white pixels was 20 pixels within a bounding box having 480 pixels by 480 pixels. The predetermined threshold should be adjusted depending on factors such as the particulars of the capillary tubes, imaging systems, and nanoparticle compositions.

At sub-step 252 (FIG. 13), the capillary tube is positioned at a start position in accordance with the zero-height position. Preferably, the start position is at a height of 8 μm or less relative to the zero-height position. The remaining steps 228 (extruding of the nanoparticle composition) and 230 (sintering) are as described with reference to method 210 (FIG. 12).

Figure 44:
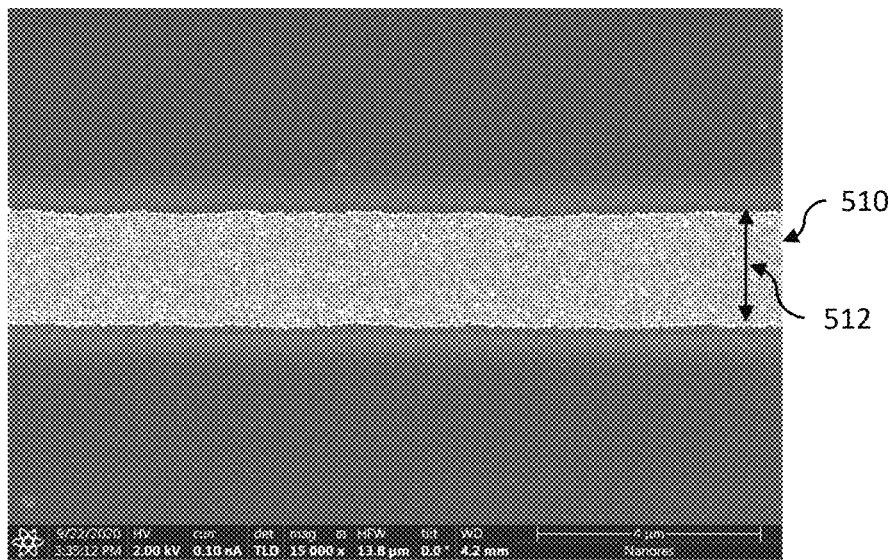

FIG. 44 is an SEM micrograph of a line 510 dispensed from a silver nanoparticle composition (Example 1). Line 510 is characterized by a line width 512. The line width 512 is estimated to be approximately 2.0 μm. The capillary tube had an outlet outer diameter of 1.5 μm. The capillary tube was at an initial height of 10 μm above the substrate when sub-step 246 was carried out. The start position (sub-step 252) was at a height of 0 μm relative to the zero-height position. During extrusion, the direction of lateral displacement relative to the tilt of the capillary tube was such that the dispenser 116 traveled ahead of the capillary tube outlet 132. During extrusion of the nanoparticle composition (step 228), the pressure applied to the nanoparticle composition dispenser was 4300 millibar and the speed of lateral displacement of the capillary tube was 0.01 mm/sec. During extrusion, the height of the capillary tube was maintained approximately constant.

Figure 14:
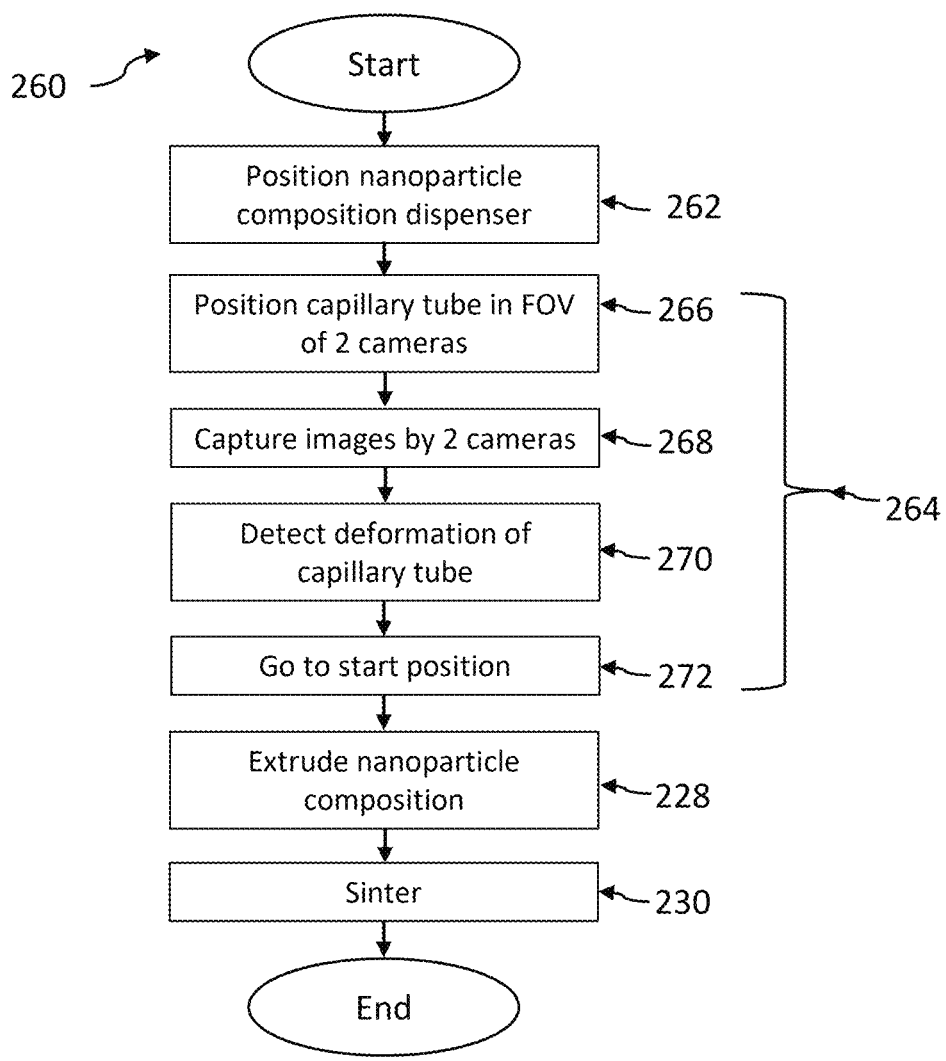

The nanoparticle composition printing apparatus 30 (FIG. 3) is used to carry out a method of extruding a nanoparticle composition onto a substrate (method 260 of FIG. 14). The printing apparatus 30 includes an imaging system 32, including a first camera 34 and a second camera 36. In addition to the cameras 34, 36, the imaging system 32 may include image processing software resident on a computer, with the computer being coupled to the cameras 34, 36. The imaging system 32 is coupled to the positioning system 108. The positioning system 108 controls the positioning of the nanoparticle composition dispenser 116, the first camera 34, and the second camera 36. The cameras 34, 36 and the capillary tube 120 are positioned and oriented relative to each other such that the capillary tube 120 and a background region are visible within a field-of-view of first camera 34 (first field-of-view) and a field-of-view of second camera 36 (second field-of-view). In the example shown in FIG. 3, first camera 34 is oriented approximately along the x-axis direction 40 and second camera 36 is oriented approximately along the y-axis direction 42, when viewed within a plane defined by the x-axis direction 40 and the y-axis direction 42 (a plane parallel to the substrate 110). The first camera 34 and the second camera 36 are positioned and oriented relative to each other such that three-dimensional (along x-axis direction 40, y-axis direction 42, and z-axis direction 44) perspective information of the capillary tube is obtained by the imaging system 32.

Figure 25:
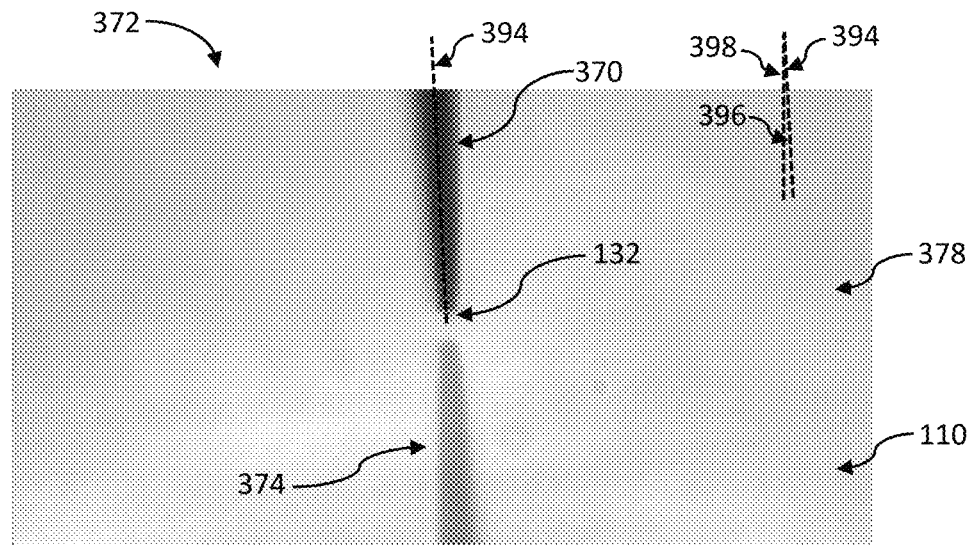
FIGS. 25, 26, 27, 28, 29, 30, 31, 32, 33, 34, 35, 36, 37, 38, 39, 40, 41, and 42 are digital images captured and processed by the imaging system during Method 3 (FIG. 14).
Figure 26:
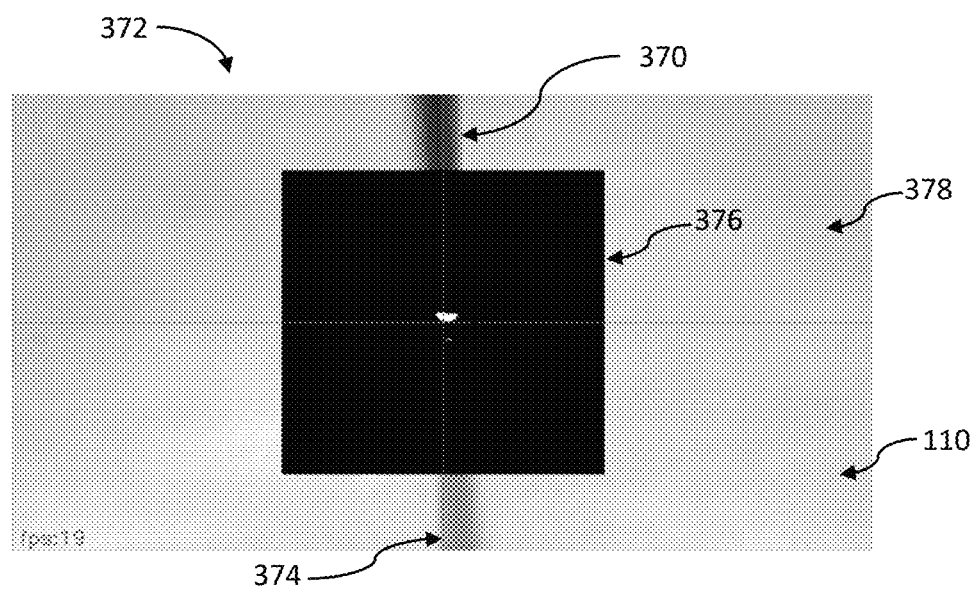

FIG. 25 is a digital image captured by first camera 34, showing its field-of-view 372. It is not necessary that the entire capillary tube 120 be visible in the field-of-view. FIG. 25 shows a portion 370 of the glass capillary tube 120 near its outlet (tip) 132 and a portion 374 of the capillary tube's reflection. Only the capillary tube portion 370 and the surrounding background region need to be visible in the field-of-view 372. FIG. 26 shows the image of FIG. 25 after image processing by the imaging system 32. A bounding box 376 has been applied to a region-of-interest within the field-of-view 372. Within the bounding box 376, a background subtraction algorithm has been applied to the pixels. Black pixels correspond to the background and white pixels correspond to areas where motion is detected. In FIG. 26, movement of capillary tube outlet 132 is detected (white pixels) as the capillary tube is lowered toward the substrate 110.

Method 260 includes steps 262, 264, 228, and 230. At step 262, the nanoparticle composition dispenser 116, which includes the capillary tube 120, is positioned above the substrate 110, and the capillary tube is oriented such that its outlet points toward the substrate. FIG. 25 shows a portion 370 of the glass capillary tube 120 near its outlet (tip) 132. The capillary tube is oriented such that its outlet 132 points toward the substrate. A first longitudinal axis 394 extending through the capillary tube 120 (portion 370 is shown) is tilted at an angle θ (396) relative to a vertical axis 398. Preferably, this angle θ is 5° or less.

Figure 27:
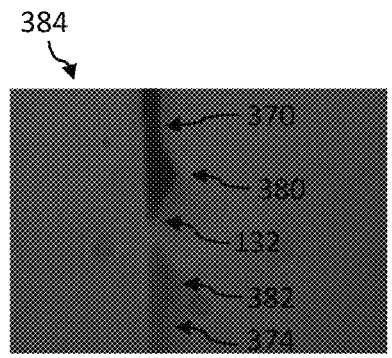
Figure 28:
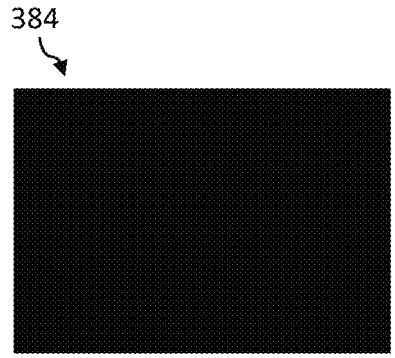
Figure 29:
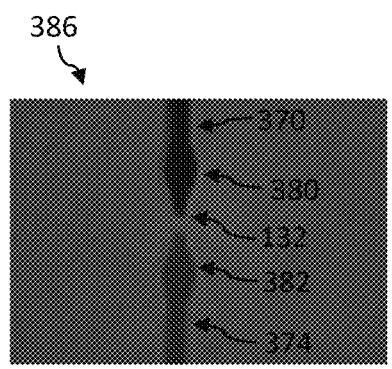
Figure 30:
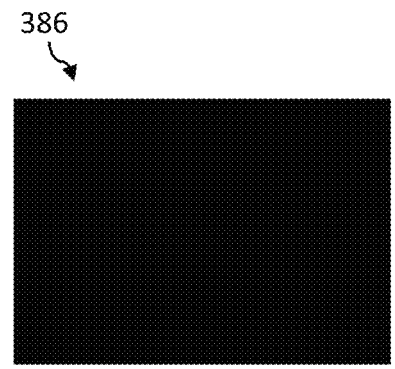

At step 264, a position of the capillary tube (in this example, position of the outlet 132 of the capillary tube) at zero height above the substrate (zero-height position) is obtained. Step 264 includes sub-steps 266, 268, 270, and 272. At sub-step 266, the capillary tube is positioned above the substrate 110 such that the capillary tube portion 370 and the background region 378 are visible within first field-of-view 372 of first camera 34 and second field-of-view of second camera 36. At sub-step 268, digital images of the capillary tube portion 370 and the background region 378 are captured by the first camera 34 and second camera 36 while lowering the capillary tube toward the substrate. For example, FIGS. 27, 28, 29, 30, 31, 32, 33, 34, 35, 36, 37, 38, 39, 40, 41, and 42 are digital images captured as the capillary tube is lowered toward the substrate. FIGS. 27 and 29 show images of the capillary tube portion 370 as captured respectively and concurrently by first camera 34 and second camera 36. The images are within the respective bounding boxes 384, 386 which are applied to respective regions-of-interest within the first field-of-view of the first camera 34 and the second field-of-view of the second camera 36. The images show a capillary tube portion 370 near its outlet 132 and a portion 374 of the capillary tube's reflection. A bulge 380 along a length of capillary tube portion 370 is a liquid droplet. In some cases, the capillary tube is immersed in a solvent before the dispensing (printing operations). Accordingly, the liquid droplet likely includes the solvent in which the capillary tube was immersed. FIGS. 28 and 30 show, respectively, the images of FIGS. 27 and 29 after image processing by the imaging system 32. Within the bounding boxes 384, 386, a background subtraction algorithm has been applied to the pixels in which black pixels correspond to the background and white pixels correspond to areas where motion is detected. FIGS. 28 and 30 are entirely or almost entirely black pixels.

Figure 31:
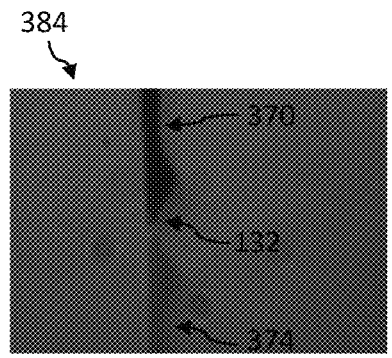
Figure 32:
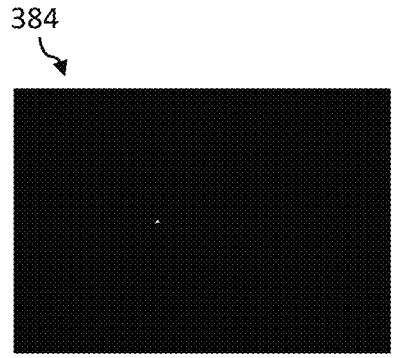
Figure 33:
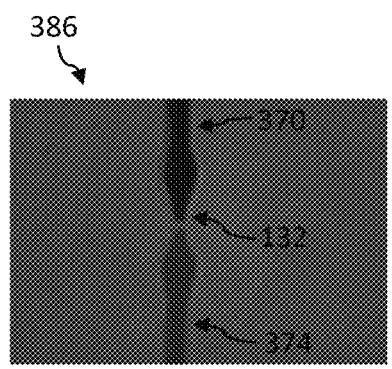
Figure 34:
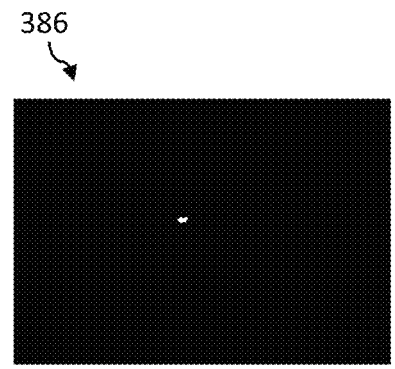

FIGS. 31 and 33 show images of the capillary tube portion 370 as captured respectively and concurrently by first camera 34 and second camera 36. FIGS. 31 and 33 show the capillary tube portion 370 when the capillary tube is lowered toward the substrate from the height shown in FIGS. 27 and 29. FIGS. 32 and 34 show, respectively, the images of FIGS. 31 and 33 after image processing by the imaging system 32. Within the bounding boxes 384, 386, a background subtraction algorithm has been applied to the pixels in which black pixels correspond to the background and white pixels correspond to areas where motion is detected. White pixels corresponding to capillary tube outlet 132 are visible in FIGS. 32 and 34. Movement of the capillary tube outlet 132 exceeds a detection threshold.

Figure 35:
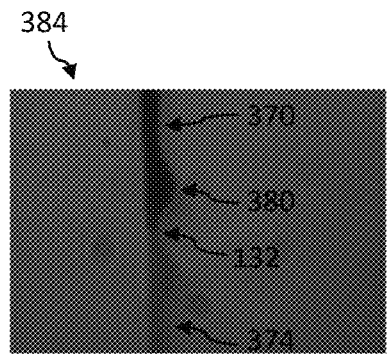
Figure 36:
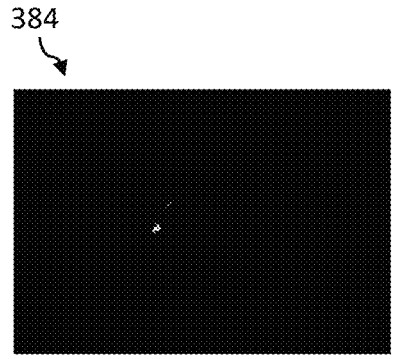
Figure 37:
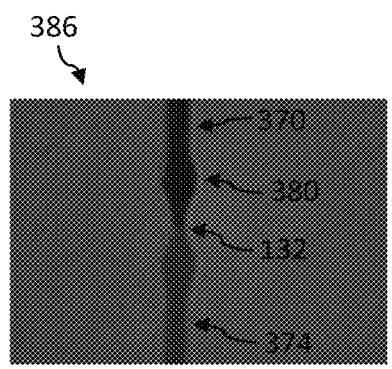
Figure 38:
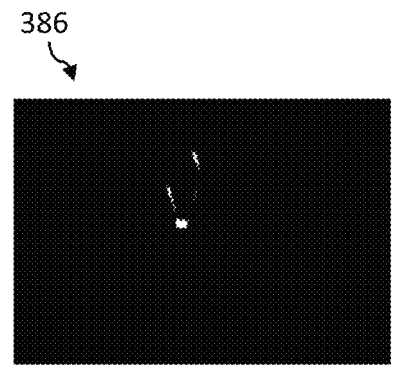

FIGS. 35 and 37 show images of the capillary tube portion 370 as captured respectively and concurrently by first camera 34 and second camera 36. FIGS. 35 and 37 show the capillary tube portion 370 when the capillary tube is lowered toward the substrate from the height shown in FIGS. 31 and 33. In FIGS. 35 and 37, the capillary tube portion 370 and reflection portion 374 appear to have merged, indicating that the capillary tube is close to contacting the substrate 110. FIGS. 36 and 38 show, respectively, the images of FIGS. 35 and 37 after image processing by the imaging system 32. Within the bounding boxes 384, 386, a background subtraction algorithm has been applied to the pixels in which black pixels correspond to the background and white pixels correspond to areas where motion is detected. White pixels corresponding to capillary tube outlet 132 and outer perimeter of the liquid droplet 380 are visible in FIGS. 36 and 38. Movement of the capillary tube outlet 132 and portions of the liquid droplet 380 exceeds a detection threshold.

Figure 39:
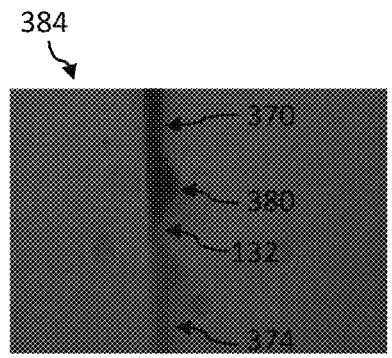
Figure 40:
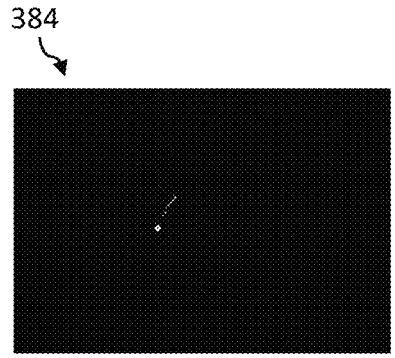
Figure 41:
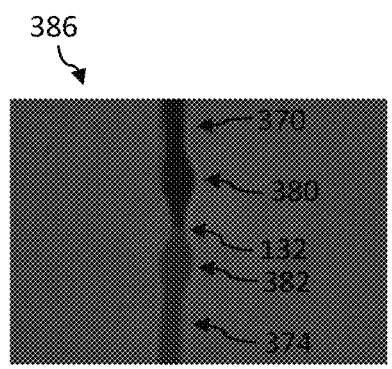
Figure 42:
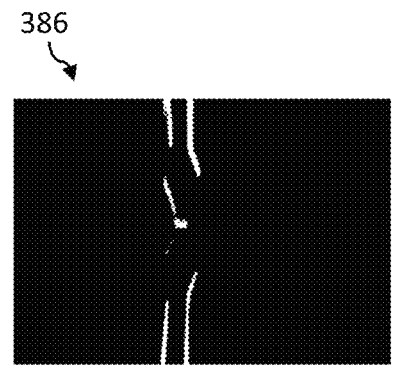

FIGS. 39 and 41 show images of the capillary tube portion 370 as captured respectively and concurrently by first camera 34 and second camera 36. FIGS. 39 and 41 show the capillary tube portion 370 when the capillary tube is lowered toward the substrate from the height shown in FIGS. 35 and 37. In FIGS. 39 and 41, as in FIGS. 35 and 37, the capillary tube portion 370 and reflection portion 374 appear to have merged. FIGS. 40 and 42 show, respectively, the images of FIGS. 39 and 41 after image processing by the imaging system 32. Within the bounding boxes 384, 386, a background subtraction algorithm has been applied to the pixels in which black pixels correspond to the background and white pixels correspond to areas where motion is detected. In FIG. 40, white pixels corresponding to capillary tube outlet 132 and outer perimeter of the liquid droplet 380 are visible. Movement of the capillary tube outlet 132 and portions of the liquid droplet 380 exceeds a detection threshold. On the other hand, FIG. 42 shows white pixels corresponding to the capillary tube outlet 132, capillary tube portion 370, reflection of the capillary tube portion 374, liquid droplet 380, and reflection of the liquid droplet 382.

Sub-step 270 includes detecting, from the digital images, a deformation of the capillary tube to determine the zero-height position. The number of white pixels in FIG. 42 exceeds a deformation detection threshold indicating a deformation of the capillary tube, accompanying the capillary tube contacting the substrate. The height of the capillary tube (as known to the positioning system) when the number of white pixels exceeds a predetermined threshold is determined to be the zero-height position. In this case, the height of the capillary tube corresponding to FIGS. 41 and 42 is determined to be the zero-height position. Since the capillary tube is oriented an angle close to the vertical direction (θ is 5° or less), the number of white pixels accompanying the capillary tube undergoing deformation (e.g., bending) upon contacting the substrate will be much greater than the number of white pixels corresponding to moving edges that are detected as the capillary tube is lowered toward the substrate. Additionally, two cameras with respective views of the capillary tube are needed because one of the two cameras might not indicate any deformation of the capillary tube (FIG. 40). In the example shown, the predetermined threshold for the number of white pixels was 2000 pixels within a bounding box having 1024 pixels by 720 pixels. The predetermined threshold should be adjusted depending on factors such as the particulars of the capillary tubes, imaging systems, and nanoparticle compositions. The predetermined threshold should be set higher than the number of white pixels that are detected from the motion of the capillary tube as it is lowered toward the substrate before the capillary tube contacts the substrate (e.g., FIGS. 32, 34, 36, and 38). If the predetermined threshold is set sufficiently high, false-positive detections from the motion of the capillary tube can be avoided.

At sub-step 272 (FIG. 14), the capillary tube is positioned at a start position in accordance with the zero-height position. Preferably, the start position is at a height of 8 µm or less relative to the zero-height position. The remaining steps 228 (extruding of the nanoparticle composition) and 230 (sintering) are as described with reference to method 210 (FIG. 12).

Figure 45:
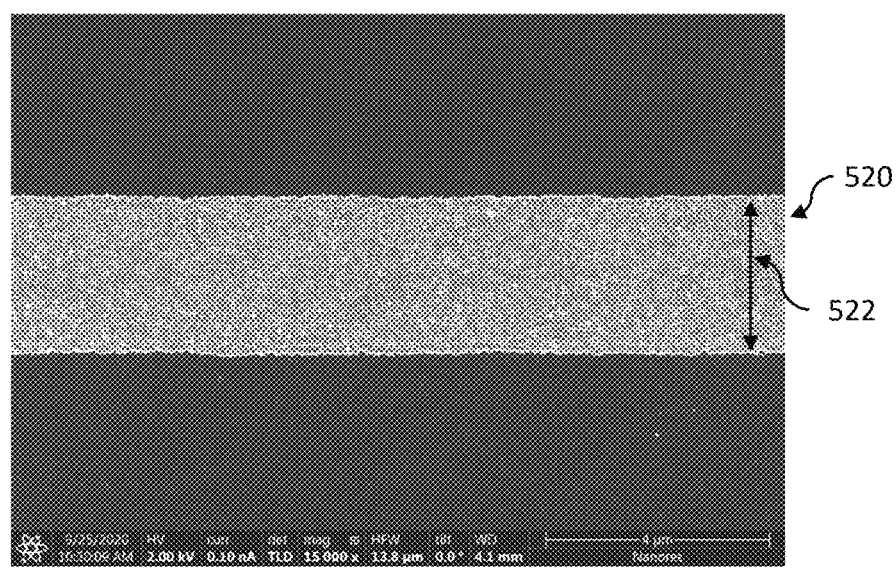

FIG. 45 is an SEM micrograph of a line 520 dispensed from a silver nanoparticle composition (Example 1). Line 520 is characterized by a line width 522. The line width 522 is estimated to be approximately 2.8 µm. The capillary tube had an outlet outer diameter of 1.5 µm. The capillary tube was at an initial height of 5 µm above the substrate when sub-step 266 was carried out. The start position (sub-step 272) was at a height of 0 µm relative to the zero-height position. During extrusion of the nanoparticle composition (step 228), the pressure applied to the nanoparticle composition dispenser was 4300 millibar and the speed of lateral displacement of the capillary tube was 0.01 mm/sec. During extrusion, the height of the capillary tube was maintained approximately constant.

Figure 46:
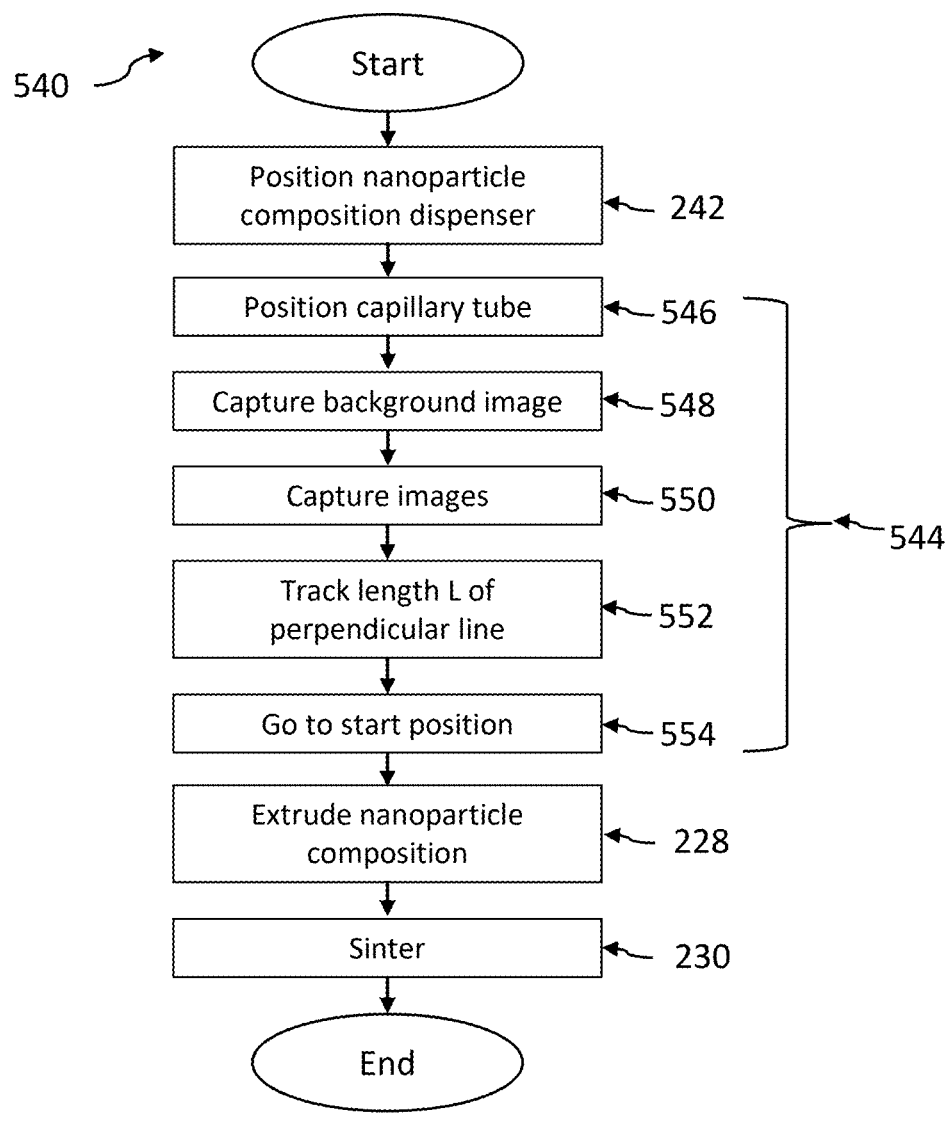
FIG. 46 is a flow diagram of a fourth method of extruding a nanoparticle composition onto a substrate (Method 4).
Figure 48:
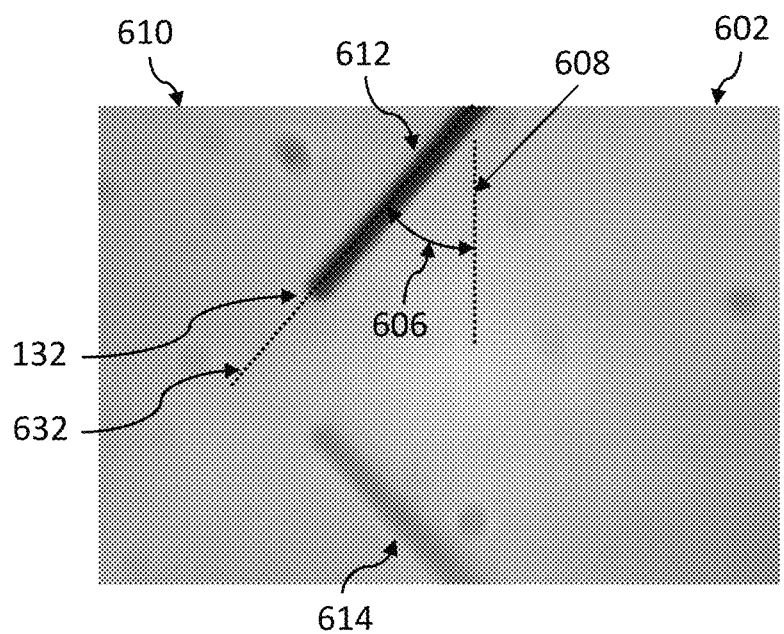

The nanoparticle composition printing apparatus 20 (FIG. 2) is used to carry out a method of extruding a nanoparticle composition onto a substrate (method 540 of FIG. 46). Details about printing apparatus 20 have already been described with reference to method 240 of FIG. 13. The camera 24 and the capillary tube 120 are positioned and oriented relative to each other such that the capillary tube 120 and the background region are visible within a field-of-view of the camera 14. For example, FIG. 48 is a digital image 610 captured by the camera 24, showing its field-of-view 602. FIG. 48 shows a portion 612 of the glass capillary tube 120 near its outlet (tip) 132 and a portion 614 of the capillary tube's reflection. Even though the capillary tube's reflection 614 is visible in this image, we do not rely upon the reflection in carrying out method 540 (Method 4). This point would be an advantage when the substrate is not sufficiently reflective or has irregular features or protrusions.

Method 540 includes steps 242, 544, 228, and 230. Steps 242, 228, and 230 have been described with reference to method 240. At step 242, the nanoparticle composition dispenser 116, which includes the capillary tube 120, is positioned above the substrate 110, and the capillary tube is oriented such that its outlet points toward the substrate. In the example shown in FIG. 48, a first longitudinal axis 632 extending through the capillary tube 120 (portion 612 is shown) is tilted at an oblique angle θ (606) relative to a vertical axis 608. Preferably, this oblique angle θ is in a range of 5° to 50°, and more preferably the oblique angle θ is in a range of 20° to 50°.

Figure 47:
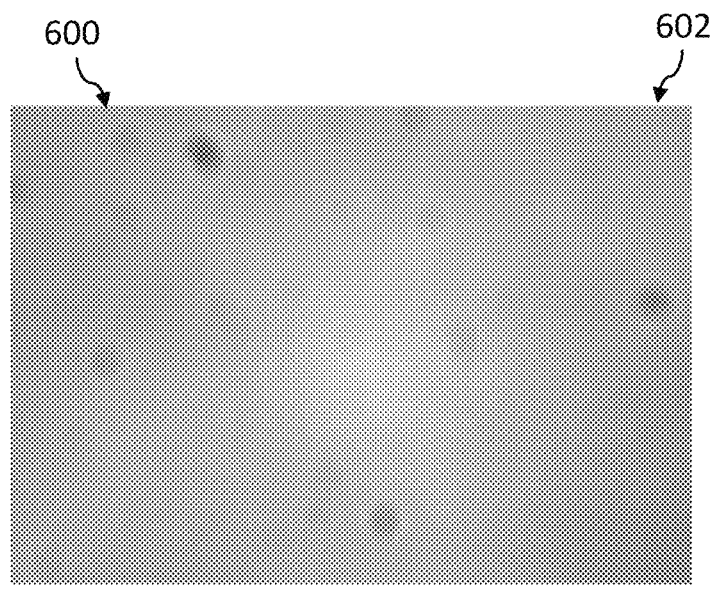
FIGS. 47, 48, 49, 50, 51, 52, 53, and 54 are digital images captured and processed by the imaging system during Method 4 (FIG. 46).

At step 544, a position of the capillary tube (in this example, position of the outlet 132 of the capillary tube) at zero height above the substrate (zero-height position) is obtained. Step 544 includes sub-steps 546, 548, 550, 552, and 554. At sub-step 546, the capillary tube is positioned above the substrate 110 such that the capillary tube portion 612 and the background region are visible within a field-of-view 602 of the camera 24 (FIG. 48). At sub-step 548, the camera 24 captures at least one digital image 600 of the background region, with the capillary tube removed from the field-of-view 602 of the camera (FIG. 47). A digital image of the background region with the capillary tube removed from the camera's field-of-view is referred to as a background image. For example, the background image 600 is captured while the capillary tube is raised to a position above the field-of-view 602.

Figure 49:
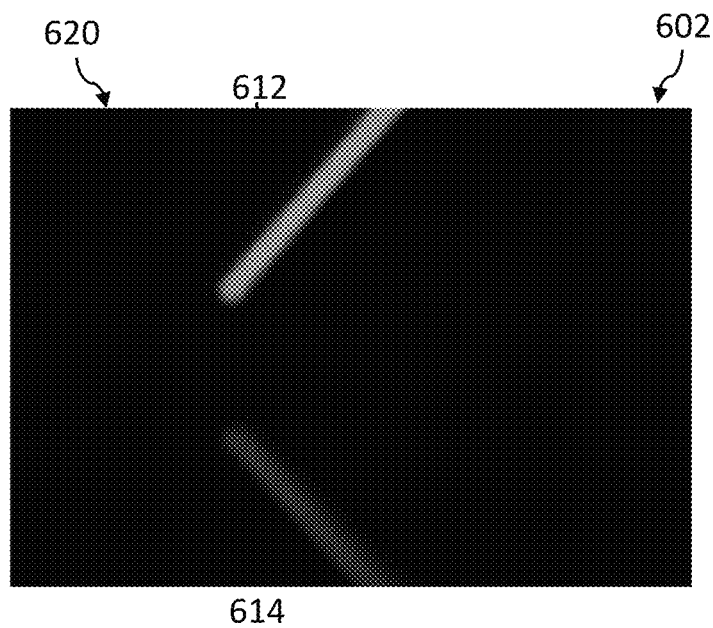

At sub-step 550, digital images of the capillary tube portion 612 and the background (raw images) are captured by the camera 24 while lowering the capillary tube toward the substrate. Raw image 610 (FIG. 48) shows the capillary tube at an origin from which the capillary will be lowered (vertical displacement). The origin can be arbitrarily chosen. In the example shown, the capillary tube portion 612 and its reflection 614 are both visible within the field-of-view 602. Accordingly, the zero-height position would also be located within the field-of-view 602. In this case, there is no need to move (e.g., lower) the field-of-view while the capillary tube is lowered toward the substrate. For each raw image, obtained at each vertical displacement position, images of the capillary tube (capillary tube images) are obtained by subtracting the background image from the respective raw image. For example, capillary tube image 620 (FIG. 49) was obtained by subtracting background image 600 (FIG. 47) from raw image 610 (FIG. 48).

Figure 50:
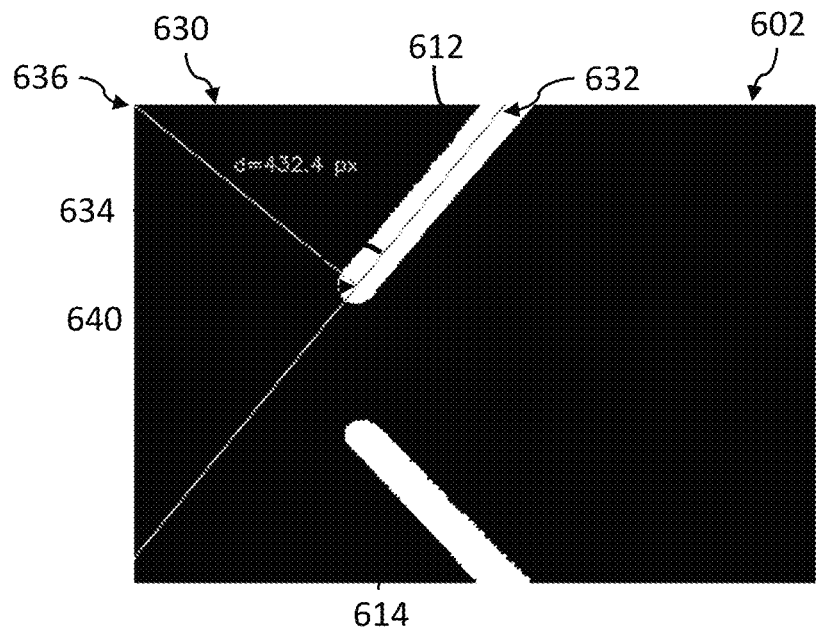

At sub-step 550, additional image processing is carried out on the capillary tube images. FIG. 50 shows a processed image 630 which is a result of the image processing carried out on image 620. The capillary tube image 620 is processed to detect the first longitudinal axis 632 extending through the capillary tube. FIG. 50 shows a virtual line 634 extending between a fixed point 636 at an outer edge of the capillary tube image 630 and a variable point 640 on the first longitudinal axis 632. In the example shown, the fixed point 636 is chosen to be the top left corner of the capillary tube image 630. The virtual line 634 and the first longitudinal axis 632 intersect at a fixed angle α. In the example shown, the fixed angle α is chosen to be 90°. Preferably, the fixed angle α is in a range of 85° to 95°. The variable point 640 is variable in the sense that its position on the first longitudinal axis 632 varies, the angle α being held fixed. In the example shown, the field-of-view 602 remains fixed as the capillary tube is lowered, so the fixed point 636 will continue to be located at the top left corner of subsequent capillary tube images that are obtained after image 630.

Figure 51:
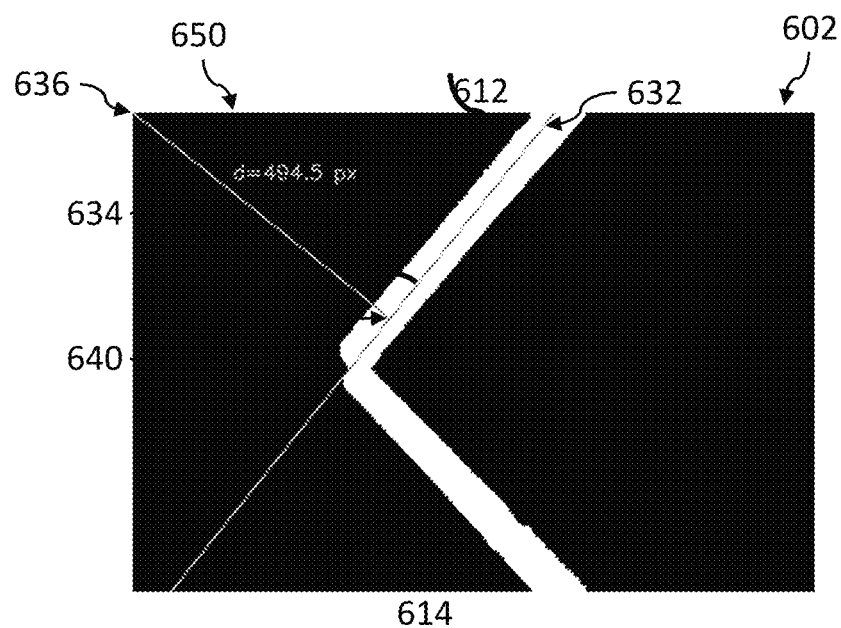
Figure 52:
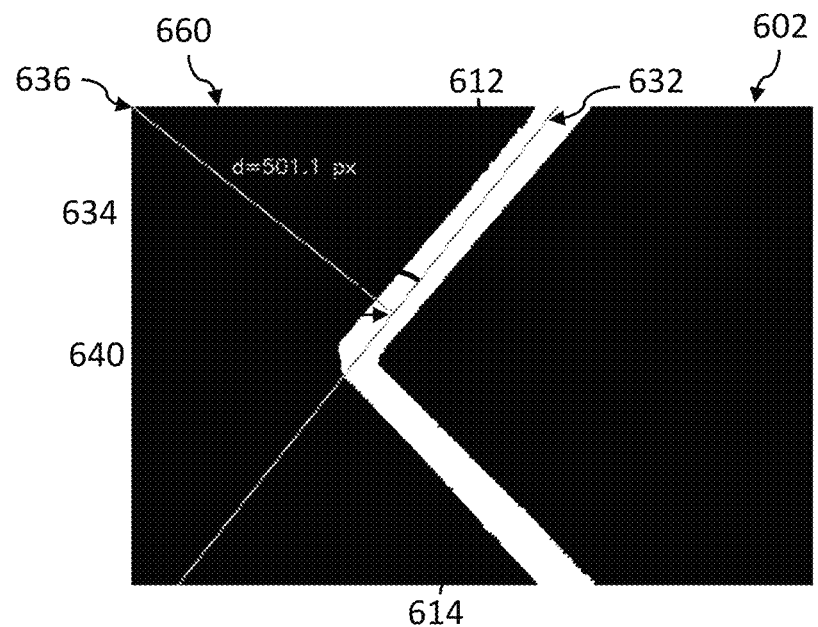
Figure 55:
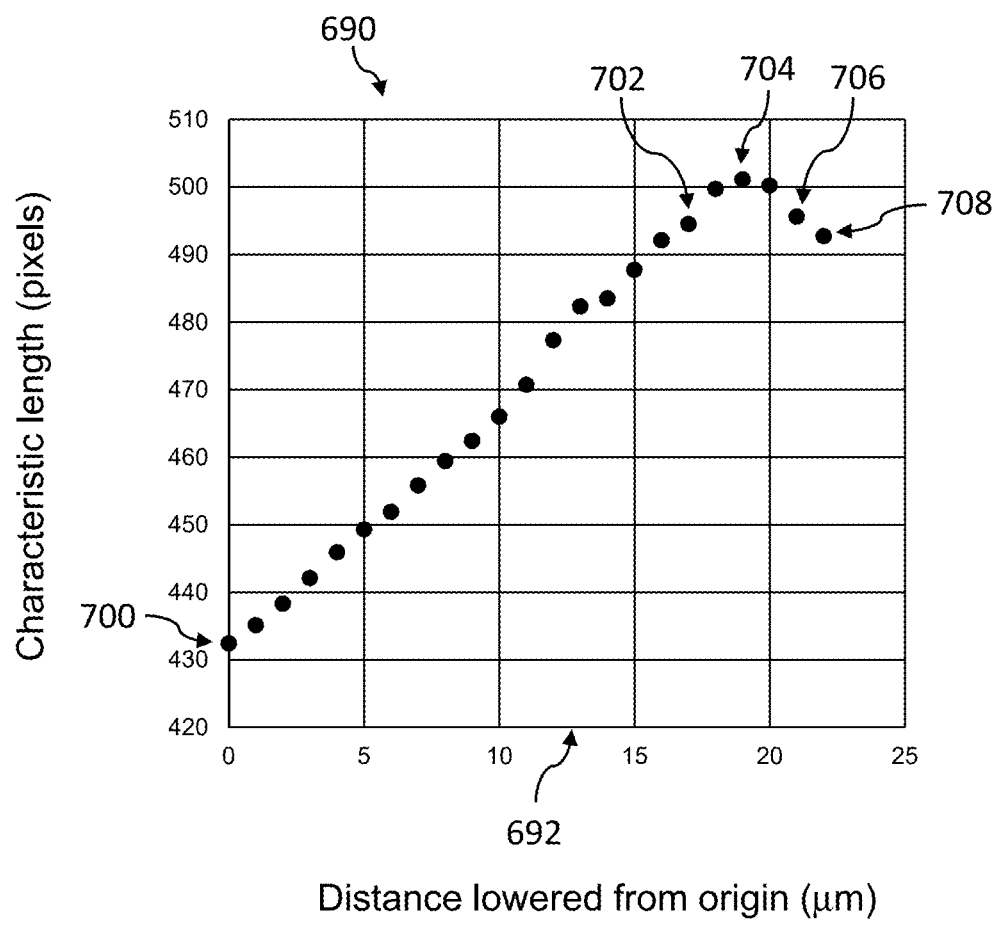
FIG. 55 is a graphical plot of a characteristic length d as a function of vertical displacement of the capillary tube.

At sub-step 552, the changes in the characteristic length d of the virtual line is tracked as the capillary tube is lowered. Additionally, at sub-step 552, the zero-height position is determined from the changes in the characteristic length d. A characteristic length d of the virtual line 634 varies at the capillary tube is lowered toward the substrate. When the capillary tube is at the origin, the characteristic length is determined to be 432.4 pixels (FIG. 50). FIG. 51 shows processed image 650 obtained at a position that is 17 µm lower than the origin, for which the characteristic length is determined to be 494.5 pixels. In FIG. 51, the capillary tube 612 and its reflection 614 appear to have merged. FIG. 55 is a graphical plot 690 of the characteristic length as a function of vertical displacement of the capillary tube. The x-axis 692 shows vertical displacement of the capillary tube (the distance lowered from the origin), in micrometers. The y-axis shows the characteristic length, expressed in pixels of the imaging system. Data points 700 and 702 correspond to FIGS. 50 and 51, respectively. FIG. 52 shows processed image 660 obtained at a position that is 19 µm lower than the origin, for which the characteristic length is determined to be 501.1 pixels (data point 704 of FIG. 55). As the capillary tube is lowered from 0 to 19 µm from the origin, the characteristic length increases monotonically. This is expected because the fixed point is at the top left corner and the capillary tube is being lowered away from the top left corner.

Figure 53:
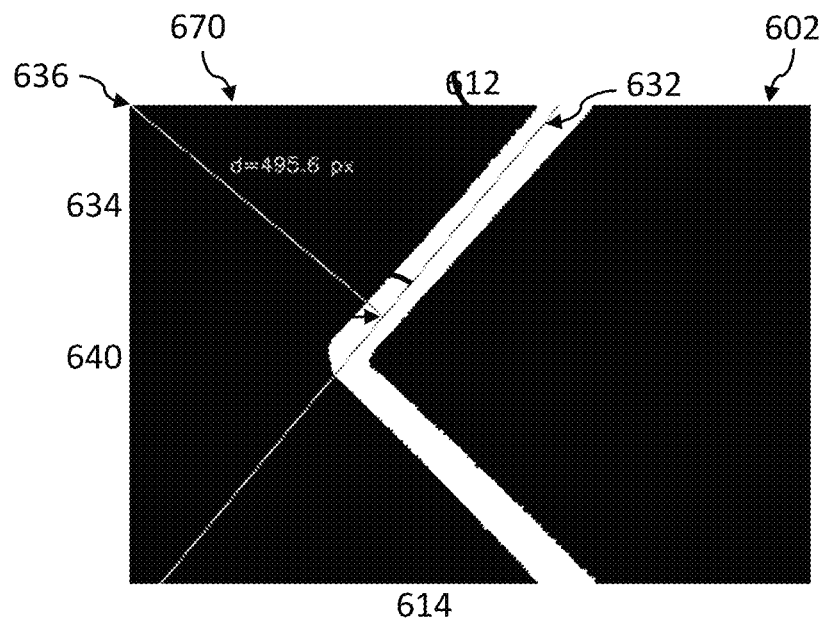
Figure 54:
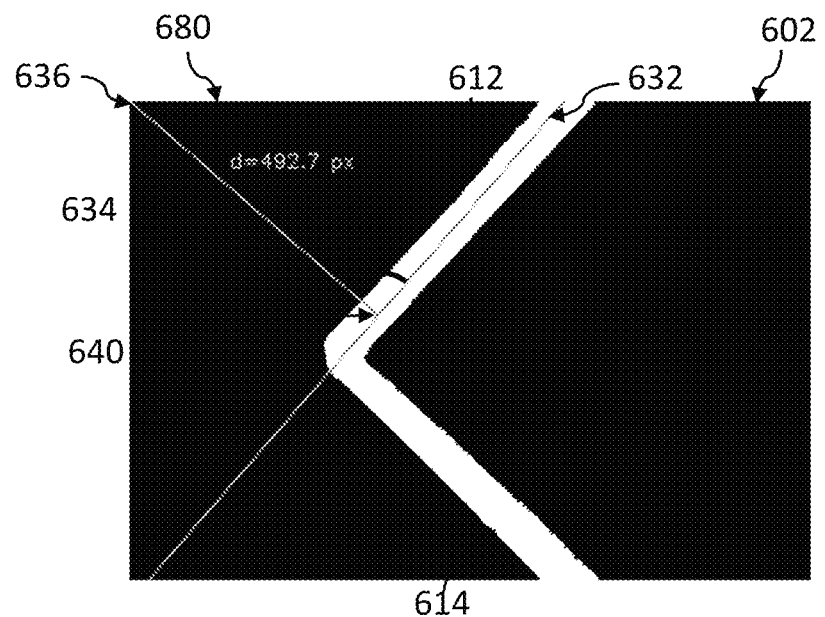

As the capillary tube is lowered beyond 19 µm from the origin, the characteristic length decreases. Data points 706 and 708 correspond to FIGS. 53 and 54, respectively. FIG. 53 shows processed image 670 obtained at a position that is 21 µm lower than the origin, for which the characteristic length is determined to be 495.6 pixels. FIG. 54 shows processed image 680 obtained at a position that is 22 µm lower than the origin, for which the characteristic length is determined to be 492.7 pixels. The characteristic length data reaches a maximum at 19 µm and then decreases for vertical displacement greater than 19 µm. In the example shown, we have set a detection threshold of 5.5 pixels: the zero-height position is determined to be the position (vertical displacement) at which the characteristic length has decreased by more than 5.5 pixels from the maximum characteristic length (characteristic length of 501.1 pixels, at data point 704). Accordingly, the zero-height position is determined to be 22 μm lower than the origin (characteristic length of 492.7 pixels, at data point 708. A requirement that the characteristic length decrease by a certain threshold value helps to preclude determining the zero-height position from a false maximum. Other threshold values can also be used depending upon the specifics of the implementation.

FIG. 24 shows the capillary tube after it has been lowered toward the substrate from the height shown in FIG. 23. The white pixels corresponding to the capillary tube outlet 132 and its reflection 350 have merged into a white region 342. The merging of the capillary tube outlet 132 and the reflection's tip portion indicates that the capillary tube has reached the zero-height position. However, the imaging system 22 does not rely upon the presence of a detectable reflection to determine the zero-height position according to method 240. While the capillary tube is being lowered to the substrate (sub-step 248), the direction of displacement of the capillary tube is primarily along the z-axis direction 44. When the capillary tube contacts the substrate, there is significant lateral displacement of the along a direction of tilt of the capillary tube, e.g., along r-axis direction 362 (within a plane defined by the x-axis direction 40 and the y-axis direction 42). The significant lateral displacement is detectable by the imaging system 22. In FIG. 24, the imaging system 22 has detected a new vertical line 352 intersecting the capillary tube outlet 132 and its reflection 350. Newly detected vertical line 352 is laterally displaced from the previously detected vertical line 346 (of a previous frame, FIG. 23). The number of white pixels enclosed between the newly detected vertical line 352 and previously detected vertical line 346 ("edge white pixels") indicates the extent of the lateral displacement. The height of the capillary tube (as known to the positioning system 108) when the number of edge white pixels exceeds a predetermined threshold is determined to be the zero-height position. In the example shown, the predetermined threshold for the number of edge white pixels was 20 pixels within a bounding box having 480 pixels by 480 pixels. The predetermined threshold should be adjusted depending on factors such as the particulars of the capillary tubes, imaging systems, and nanoparticle compositions.

At sub-step 554 (FIG. 46), the capillary tube is positioned at a start position in accordance with the zero-height position. Preferably, the start position is at a height of 8 μm or less relative to the zero-height position (i.e., at the zero-height position, or higher than the zero-height position by 8 μm or less). The remaining steps 228 (extruding of the nanoparticle composition) and 230 (sintering) are as described with reference to method 210 (FIG. 12) and method 240 (FIG. 13).

EXAMPLES

Example 1: Silver Nanoparticle Paste Composition (85 wt %) in Triethylene Glycol, Including Dispersing Agent 2 wt %

Reagents:
 AgNO$_3$—12.5 g
 PVP (K30 grade)—100.1 g
 Ethylene glycol—560 ml
 Acetone—1520 ml
 Ethanol 96%—300 ml
 Triethylene glycol—1.326 ml
 Dispersing agent, alkylammonium salt of a copolymer with acidic groups—235.2 μl 1) Synthesis Two synthesis reactions were done in parallel. For each synthesis reaction: AgNO$_3$ (12.5 g) was dissolved in 50 ml of Ethylene Glycol at room temperature. In a three-necked flask, PVP (100.2 g) was dissolved in 250 ml of Ethylene Glycol, under reflux, while heating at 140° C. AgNO$_3$ solution was poured in a quick movement (via funnel) into hot PVP dissolved in Ethylene Glycol. Mixtures were heated at 140° C. for 60 min under vigorous stirring. Finally, cooled in cold water bath until room temperature was reached.

2) Purification

Mixture from each synthesis was poured into a 2.5 liter beaker. 100 ml of Ethylene Glycol was added to the three-necked reaction flask, sonicated for 1 min under stirring and pooled with the previously mentioned fraction. 1440 ml of Acetone and 160 ml of Ethylene Glycol were mixed in a 2 liter beaker and poured into the beaker containing the Ag NPs suspension, under stirring first at 500 rpm, then 900 rpm. Another 40 ml of acetone was then added, then another 40 ml of acetone was added. There was a change in the color of the solution from dark green to brown. The contents of the beaker were poured equally into six 500 ml centrifuge bottles and were centrifuged for 15 min@4000×g. Clear orange supernatants were discarded. Silver pellets were re-dispersed in 40 ml of ethanol (per bottle) under sonication and shaking (10 min). The solution were poured into two bottles (120 ml per bottle), followed by centrifugation for 35 min@11000×g. The pellet were individually re-dispersed in premixtures of 30 ml EtOH and 58.8 μl dispersing agent (for each of 4 bottles of the double synthesis) under sonication and shaking (10 min).

3) Formulation

Approximately 120 ml of obtained dispersion were transferred into a syringe and filtered through 1.0 μm PA filter directly into round-bottom flask. 1.326 ml of triethylene glycol were added. Flask was placed on rotary evaporator at 43° C., 110 mbar for 40 min and then set to 35 mbar. Time taken to reach the set pressure was 30 min, and when reached, the condition was maintained for 5 min. Paste-like composition was transferred into a syringe and filtered through a 0.45 μm PVDF filter directly into 5 ml PE syringe (filled from top). Obtained dispersion is estimated to have a solid content concentration of 85 wt %±2 wt % (based on TGA measurement). Silver content is estimated to be in a range of 79 wt % to 83 wt % (based on ICP or AAS measurement). The concentration of the dispersing agent in the composition is estimated to be approximately 2 wt %.

What is claimed is:

1. A method of extruding a nanoparticle composition onto a substrate, comprising the steps of:
  (A) positioning a nanoparticle composition dispenser comprising a capillary tube above the substrate, the capillary tube being oriented such that its outlet points toward the substrate and a first longitudinal axis extending through the capillary tube is tilted at an oblique angle θ relative to a vertical axis;
  (B) estimating a position of the capillary tube at zero height above the substrate (zero-height position); and
  (C) extruding the nanoparticle composition from the capillary tube onto the substrate while displacing the capillary tube relative to the substrate from a start position to an end position;
  wherein the step (B) of estimating the zero-height position comprises the sub-steps of: (B1) positioning the capillary tube above the substrate such that the capillary tube and its reflection from the substrate are visible within a field-of-view of a camera of an imaging system;

(B2) capturing, by the camera, digital images of the capillary tube and its reflection;

(B3) processing the digital images to detect the first longitudinal axis extending through the capillary tube and a second longitudinal axis extending through the reflection;

(B4) calculating a point of intersection of the first longitudinal axis and the second longitudinal axis to estimate the zero-height position;

(B5) obtaining a correlation of digital vertical displacement in the digital images to physical vertical displacement of the capillary tube; and (B6) positioning the capillary tube at the start position in accordance with the zero-height position and the correlation.

2. The method of claim 1, wherein the nanoparticle composition comprises metallic nanoparticles at a concentration of 75 wt % or greater.

3. The method of claim 1, wherein the nanoparticle composition comprises silver nanoparticles or copper nanoparticles.

4. The method of claim 1, wherein the outlet of the capillary tube has an outer diameter in a range of 0.7 µm to 8 µm.

5. The method of claim 1, wherein the capillary tube is a glass capillary tube.

6. The method of claim 1, wherein the start position is at a height of 8 µm or less relative to the zero-height position.

7. The method of claim 1, wherein the oblique angle θ is in a range of 5° to 50°.

8. The method of claim 1, wherein a pressure is applied to the nanoparticle composition in the dispenser at the step (C), the pressure being in a range of 0 bar to 9 bar.

9. A method of extruding a nanoparticle composition onto a substrate, comprising the steps of:

(A) positioning a nanoparticle composition dispenser comprising a capillary tube above the substrate, the capillary tube being oriented such that its outlet points toward the substrate and a first longitudinal axis extending through the capillary tube is tilted at an oblique angle θ relative to a vertical axis;

(B) obtaining a position of the capillary tube at zero height above the substrate (zero-height position); and (C) extruding the nanoparticle composition from the capillary tube onto the substrate while displacing the capillary tube relative to the substrate from a start position to an end position;

wherein the step (B) of obtaining the zero-height position comprises the sub-steps of:

(B1) positioning the capillary tube above the substrate such that the capillary tube and a background region are visible within a field-of-view of a camera of an imaging system;

(B2) capturing, by the camera, at least one digital image of the background region (background image), with the capillary tube removed from the field-of-view of the camera;

(B2) capturing, by the camera, digital images of the capillary tube and the background region (raw images) while lowering the capillary tube toward the substrate;

(B3) obtaining images of the capillary tube (capillary tube images) by subtracting the background image from the raw images;

(B4) processing the capillary tube images to detect the first longitudinal axis extending through the capillary tube;

(B5) determining a virtual line that extends between a fixed point at an outer edge of the capillary tube images and a variable point on the first longitudinal axis, the virtual line and the first longitudinal axis intersecting at a fixed angle «;

(B6) tracking changes in a characteristic length d of the virtual line as the capillary tube is lowered toward the substrate;

(B7) determining the zero-height position from the changes in the characteristic length d; and (B8) positioning the capillary tube at the start position in accordance with the zero-height position.

10. The method of claim 9, wherein the nanoparticle composition comprises metallic nanoparticles at a concentration of 75 wt % or greater.

11. The method of claim 9, wherein the nanoparticle composition comprises silver nanoparticles or copper nanoparticles.

12. The method of claim 9, wherein the outlet of the capillary tube has an outer diameter in a range of 0.7 µm to 8 µm.

13. The method of claim 9, wherein the capillary tube is a glass capillary tube.

14. The method of claim 9, wherein the start position is at a height of 8 µm or less relative to the zero-height position.

15. The method of claim 9, wherein the oblique angle θ is in a range of 5° to 50°.

16. The method of claim 9, wherein a pressure is applied to the nanoparticle composition in the dispenser at the step (C), the pressure being in a range of 0 bar to 9 bar.

17. The method of claim 9, wherein the fixed angle α is in a range of 85° to 95°.

18. A method of extruding a nanoparticle composition onto a substrate, comprising the steps of:

(A) positioning a nanoparticle composition dispenser comprising a capillary tube above the substrate, the capillary tube being oriented such that its outlet points toward the substrate and a first longitudinal axis extending through the capillary tube is at an angle θ relative to a vertical axis, θ being 5° or less;

(B) obtaining a position of the capillary tube at zero height above the substrate (zero-height position); and (C) extruding the nanoparticle composition from the capillary tube onto the substrate while displacing the capillary tube relative to the substrate from a start position to an end position;

wherein the step (B) of obtaining the zero-height position comprises the sub-steps of:

(B1) positioning the capillary tube above the substrate such that the capillary tube and a background region are visible within a first field-of-view of a first camera of an imaging system and within a second field-of-view of a second camera of the imaging system;

(B2) capturing, by the first camera and by the second camera, digital images of the capillary tube and the background region while lowering the capillary tube toward the substrate;

(B3) detecting, from the digital images, a deformation of the capillary tube to determine the zero-height position; and (B4) positioning the capillary tube at the start position in accordance with the zero-height position;

wherein the first camera and the second camera are positioned and oriented relative to each other such that three-dimensional perspective information of the capillary tube is obtained.

19. The method of claim 18, wherein the nanoparticle composition comprises metallic nanoparticles at a concentration of 75 wt % or greater.

20. The method of claim 18, wherein the nanoparticle composition comprises silver nanoparticles or copper nanoparticles.

21. The method of claim 18, wherein the outlet of the capillary tube has an outer diameter in a range of 0.7 μm to 8 μm.

22. The method of claim 18, wherein the capillary tube is a glass capillary tube.

23. The method of claim 18, wherein the start position is at a height of 8 μm or less relative to the zero-height position.

24. The method of claim 18, wherein a pressure is applied to the nanoparticle composition in the dispenser at the step (C), the pressure being in a range of 0 bar to 9 bar.

* * * * *